(12) United States Patent
Burowski et al.

(10) Patent No.: US 11,765,544 B2
(45) Date of Patent: *Sep. 19, 2023

(54) COMMUNICATION TECHNIQUES USING PASSIVE BEACONS

(71) Applicant: APPLE INC., Cupertino, CA (US)

(72) Inventors: Yagil Burowski, Sunnyvale, CA (US); Santhoshkumar Mani, San Diego, CA (US); Robert W. Brumley, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,862

(22) Filed: Aug. 25, 2022

(65) Prior Publication Data

US 2023/0056966 A1 Feb. 23, 2023

Related U.S. Application Data

(63) Continuation of application No. 16/905,582, filed on Jun. 18, 2020, now Pat. No. 11,470,444.

(51) Int. Cl.
*H04W 4/02* (2018.01)
*G01S 3/50* (2006.01)
(Continued)

(52) U.S. Cl.
CPC .............. *H04W 4/023* (2013.01); *G01S 3/50* (2013.01); *H04W 74/0808* (2013.01); *G01S 13/765* (2013.01)

(58) Field of Classification Search
CPC .......................... H04W 4/023; H04W 74/0808
See application file for complete search history.

(56) References Cited

U.S. PATENT DOCUMENTS 11,470,444 B2 * 10/2022 Burowski .......... H04W 74/0808
2017/0212205 A1 * 7/2017 Bialer ....................... G01S 3/50
(Continued)

OTHER PUBLICATIONS

U.S. Appl. No. 16/777,631, dated Jan. 30, 2020 in 79 pages.
(Continued)

*Primary Examiner* — Brenda H Pham
(74) *Attorney, Agent, or Firm* — KILPATRICK, TOWNSEND AND STOCKTON LLP

(57) ABSTRACT

Certain embodiments are directed to techniques (e.g., a device, a method, a memory or non-transitory computer readable medium storing code or instructions executable by one or more processors) for passive beacon communication techniques. Transmitting devices (e.g., beacons) can transmit advertising messages using a first wireless protocol to provide timing for ranging messages for one of more ranging messages over a second protocol (e.g., UWB). One or more receiving devices can determine using signal strength if the devices are within a threshold range to perform communication techniques. Various ranging communications techniques can be used to determine a range between the receiving device and transmitting device. Other techniques can be used to passively calculate the angle of arrival for transmitter signals. The angle of arrival information can be used for precise position locating for the receiving device or to indicate interest in information provided by the one or more transmitting devices.

20 Claims, 13 Drawing Sheets

(51) Int. Cl.
*H04W 74/08* (2009.01)
*G01S 13/76* (2006.01)

(56) References Cited

U.S. PATENT DOCUMENTS

| | | | |
|---|---|---|---|
| 2018/0348328 A1* | 12/2018 | Athley | G01S 3/32 |
| 2019/0056472 A1* | 2/2019 | Smith | G01S 3/46 |
| 2020/0386844 A1* | 12/2020 | Park | G01S 3/18 |
| 2021/0400427 A1 | 12/2021 | Burowski et al. | |

OTHER PUBLICATIONS

Non-Final Office Action issued in U.S. Appl. No. 16/905,582, dated Feb. 22, 2022 in 11 pages.
Notice of Allowance issued in U.S. Appl. No. 16/905,582, dated May 27, 2022 in 7 pages.

* cited by examiner

COMMUNICATION TECHNIQUES USING PASSIVE BEACONS

CROSS-REFERENCES TO RELATED APPLICATIONS

This application is a continuation of U.S. application Ser. No. 16/905,582, filed Jun. 18, 2020, entitled "Communication Techniques Using Passive Beacons," the disclosure of this application is incorporated by reference herein in their entirety and for all purposes.

BACKGROUND

Various applications of mobile devices utilize the wireless communication techniques to share or exchange information between the devices. Information exchange techniques can be limited on the number of participating devices due to collision between information packet exchanges using a wireless protocol. Previous techniques can require complicated scheduling techniques to minimize packet collisions and account for devices entering and leaving the packet exchanges. In addition, maintaining the device, specifically the transceiver circuitry, in a powered-on state until the next transmission time can drain the battery of the device.

Beacons can wirelessly provide information to one or more mobile devices. However, techniques that provide information in an unsolicited manner is undesirable. Therefore, techniques that measure an interest in a user obtaining the information are advantageous. For example, a processor of a mobile device can ascertain if a user is manipulating a mobile device with respect to a threshold of a beacon to ascertain user interest.

Techniques for determining range or angular relationship between electronic devices using one-to-one communications is inefficient. These techniques are complicated because the internal clocks of various electronic devices are not synchronized with each other. In some circumstances, a beacon may provide information concerning the local environment that can be provided to multiple electronic devices. In some cases, users with electronic devices are trying to obtain their range and/or angular measurements from a beacon. In cases with a single beacon and multiple receiving devices, communicating in the same bandwidth can result in collisions between the data packets. The collisions can result in missed ranging measurements. It can been advantageous for a technique to allow account for these potential collisions in implementing techniques for efficient ranging techniques.

BRIEF SUMMARY

Certain embodiments are directed to techniques (e.g., a device, a method, a memory or non-transitory computer readable medium storing code or instructions executable by one or more processors) for communication techniques between a transmitting device (e.g., a beacon) and one or more mobile devices (e.g., a smartphone, a tablet, a wearable device etc.). In various embodiments, the communication techniques refer to a mode (e.g., a listening mode for a receiving device and a broadcast mode for a transmitting device). In this way, the number of receiving devices is not as limited as with other communication techniques.

A passive beacon can transmit a timing signal via a wireless protocol (e.g., Bluetooth Low Energy (BLE) advertising). The timing signal informs one or more other mobile devices of a start of a transmission cycle. The beacon can transmit information via a predictable schedule starting a predetermined time from the transmission of the timing signal. The schedule for transmission can be generated by the beacon or it can be hardcoded in the mobile device.

Having a predetermined time for transmitting information, the beacon device can enter a lower-power mode until just prior to the transmission time. At the predetermined time, the beacon can transmit information via a wireless protocol (e.g., UWB protocol). The information can include a link the mobile device can use to receive information. The mobile devices can use the times of reception of the signals at multiple antennas to determine an angle of arrival from the beacon to the device. Use cases can include pointing their mobile device at a beacon to receive information (e.g., a bus or train schedule).

The processor on the mobile device can detect that the angular information is within certain threshold from a beacon (e.g., a beacon on a signpost for a bus). When the angular position of the device is within a certain threshold with respect to the beacon, the beacon can transmit a link to the mobile device. The link can point to stored information (e.g., online, or locally) that is accessible to the mobile device, e.g., a timetable for the bus can be retrieved. A user can obtain the information by selecting the link or the information can be obtained automatically. In another use case, multiple beacons can be used to determine an accurate location (via triangulation of the angles of arrive from the beacons) of the mobile device within a facility, even if it is indoors where GPS signals may not be accurate. In one example, a series of beacons can be used for a walking tour in a museum where information can be presented to one or more mobile devices (carried by museum patrons) based on the position of the mobile device or orientation of the mobile device to the one or more beacons that can be placed on or near various exhibits.

In some embodiments, the signal strength of the transmitted signal can be used as a rough way to calculate time of flight and calculate a rough estimate of range between the transmitter and the receiver.

A receiving electronic device (e.g., mobile device (may be provided with wireless circuitry. The wireless circuitry may include one or more antennas. The antennas may be configured to receive IEEE 802.15.4 ultra-wideband communications signals and/or millimeter wave signals. The antennas may also include wireless local area network antennas, satellite navigation system antennas, cellular telephone antennas, and other antennas.

The electronic device may be provided with control circuitry and a display. The control circuitry may determine where nearby electronic devices are located relative to the electronic device. The display may produce images that indicate where the nearby device is located. The control circuitry may determine when the electronic device is oriented in a particular way relative to a nearby device. In response to determining that the electronic device is arranged end-to-end or side-to-side with another device, for example, the control circuitry may use wireless transceiver circuitry to automatically exchange information with the electronic device or may automatically prompt the user to indicate whether the user would like to exchange information with the electronic device.

The control circuitry may determine the location of a nearby electronic device by calculating the angle of arrival of signals that are transmitted by the nearby electronic device (e.g., a beacon). To obtain a complete, unambiguous angle of arrival solution, the electronic device may be moved into different positions during angle of arrival measurement operations. At each position, the control circuitry may calculate a phase difference associated with the received signals. Motion sensor circuitry may gather motion data as the electronic device is moved into the different positions. The control circuitry may use the received antenna signals and the motion data to determine the complete angle of arrival solution.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

Figure 1:
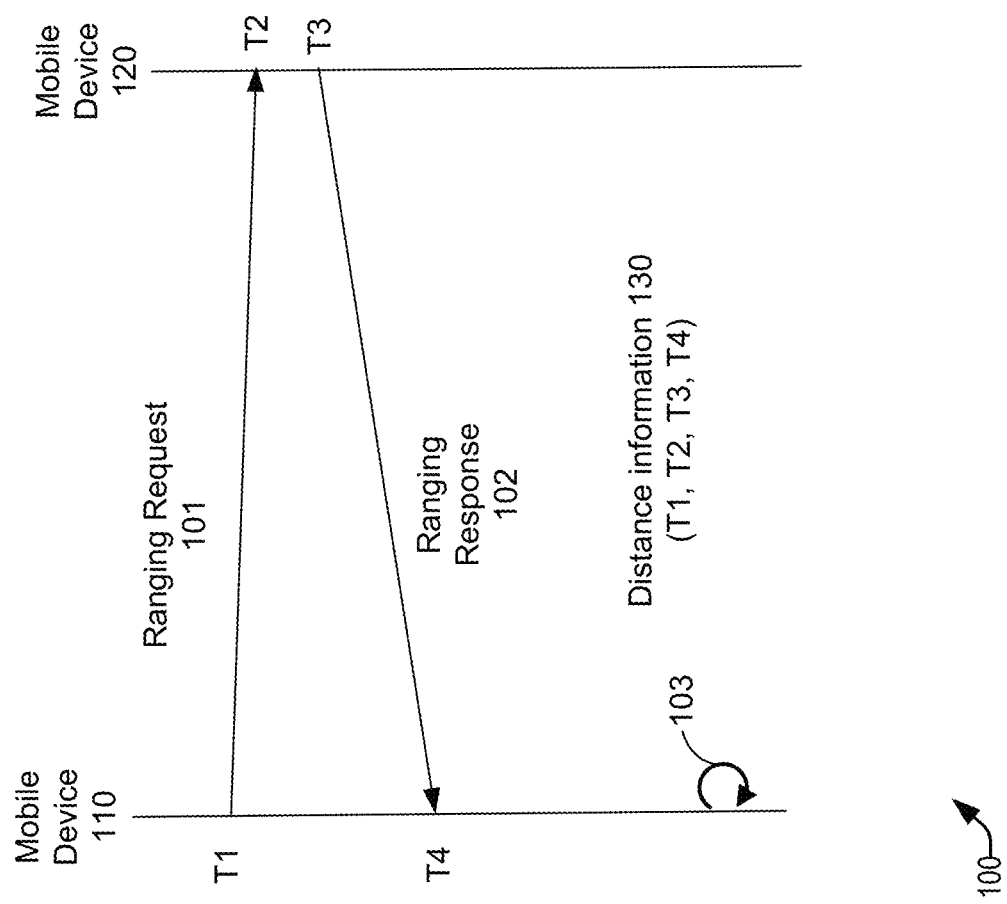
FIG. 1 shows a sequence diagram for performing a ranging measurement between two mobile devices according to embodiments of the present disclosure.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Certain embodiments are directed to techniques (e.g., a device, a method, a memory or non-transitory computer readable medium storing code or instructions executable by one or more processors) for communication techniques, e.g., using beacons.

Passive beacons can provide information to multiple mobile devices. As an example, the information sharing techniques can gauge a user's interest in receiving the information. The interest can be measured by calculating an angle of arrival of messages from the beacon to antennas on the mobile device. Orientation data received from other sensors on the mobile device can measure an orientation of the mobile device. The mobile device can use the angle of arrival data combined with the orientation data to determine if a user is directing the mobile device toward the beacon (or within a threshold of the beacon device). The angle of arrival and orientation data can be used as an indicator of user interest in the information provided by the beacon. In various embodiments, the beacons can provide a link in an information packet. The mobile devices can use those links to received information from a network (e.g., the Internet).

As another example, multiple passive beacons can be used at a location to determine a precise location of the mobile device. Using the techniques described herein, a mobile device can use triangulation techniques using calculated angles of arrival from two or more beacons at known locations to determine a precise location. This can be done passively, so the mobile device does not need to transmit any signals.

The passive beaconing techniques described herein allow multiple users to receive information without complex point-to-point information sharing routines. The beacons can use a low-energy advertising mode to provide timing information for transmission of information signals, enabling the receiving devices to conserve energy in a low power mode. The mobile devices can use signal strength of the received signals as a threshold determination to evaluate if communication techniques with the passive beacon are possible.

The techniques described herein have numerous use cases. The beacons can provide information to interested users at various transportation facilities. This can include schedules, routes, fare information, and contact information for transportation service provider. The beacons can be used to provide information regarding exhibits in museums or at events. The exhibit information can provide detailed information about the exhibit, donors, historical background of exhibit, benefactors, and other similar exhibits. The beacons can be used to for precision location determination indoors as part of a walking tour for a museum. The beacons can be used to provide information to users for various vendors, stores, or restaurants. The vendor information can include menus, price lists, inventory listings, available reservation times, contact information, reviews, sales, or event information.

In various embodiments, the mobile device can serve as a beacon for point-of-sale transaction for electronic payments. In this way, a customer can receive a link from a beacon device for electronic payment of goods and services using a mobile device.

A brief review of ranging and triangulation techniques follows below.

I. Ranging/Triangulation Techniques

A mobile device can include circuitry for performing ranging measurements. Such circuitry can include one or more dedicated antennas (e.g., three antennas) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

FIG. 1 shows a sequence diagram 100 for performing a ranging measurement between two mobile devices according to embodiments of the present disclosure. The two mobile devices may belong to two different users. In various embodiments, the mobile device 110 can be a beacon. The two users may know each other, and thus have each other's phone numbers or other identifiers. As described in more detail later, such an identifier can be used for authentication purposes, e.g., so ranging is not performed with unknown devices. Although FIG. 1 shows a single measurement, the process can be repeated to perform multiple measurements over a time interval as part of a ranging session, where such measurements can be averaged or otherwise analyzed to provide a single distance value, e.g., for each antenna.

A first mobile device 110 (e.g., a smartphone) can initiate a ranging measurement (operation) by transmitting a ranging request 101 to a second mobile device 120. Ranging request 101 can include a first set of one or more pulses. The ranging measurement can be performed using a ranging wireless protocol (e.g., ultra-wideband (UWB)). The ranging measurement may be triggered in various ways, e.g., based on user input and/or authentication using another wireless protocol, e.g., Bluetooth Low Energy (BLE).

At T1, the first mobile device 110 transmits ranging request 101. At T2, the second mobile device 120 receives ranging request 101. T2 can be an average received time when multiple pulses are in the first set. The second mobile device 120 can be expecting the ranging request 101 within a time window based on previous communications, e.g., using another wireless protocol. The ranging wireless protocol and another wireless protocol can be synchronized so that mobile device 120 can turn on the ranging antenna(s) and associated circuitry for a specified time window, as opposed to leaving them on for an entire ranging session.

In response to receiving the ranging request 101, mobile device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that mobile device 110 can compute distance information. As an alternative, a delta between the two times (e.g., T3-T2) can be sent. The ranging response 102 can also include an identifier for the first mobile device 110, an identifier for the second mobile device 120, or both.

At T4, the first mobile device 110 can receive ranging response 102. Like the other times, T4 can be a single time value or a set of time values.

At 103, the first mobile device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2-T1+T4-T3. In some embodiments, the processing time for the second mobile device 120 can also be subtracted from the total round-trip time. More complex calculations can also be used, e.g., when the times correspond to sets of times for sets of pulses and when a frequency correction is implemented.

However, ranging may not be required and may be difficult in certain applications. As the number of participating devices increases the complexity of the ranging sessions also increases due to potential of collisions between ranging packets in the same frequency band. In addition, other ranging techniques can be complicated when one or more mobile devices enter or leave the communication session especially of the mobile device is designated at the coordinator mobile device. Therefore, one-way communication techniques can provide information to mobile device when location of the mobile device is not required. In addition, multiple beacons can be used for precise position location of mobile devices with the receiving devices in a passive receive only mode.

B. Triangulation to Determine Angle of Arrival

Figure 2:
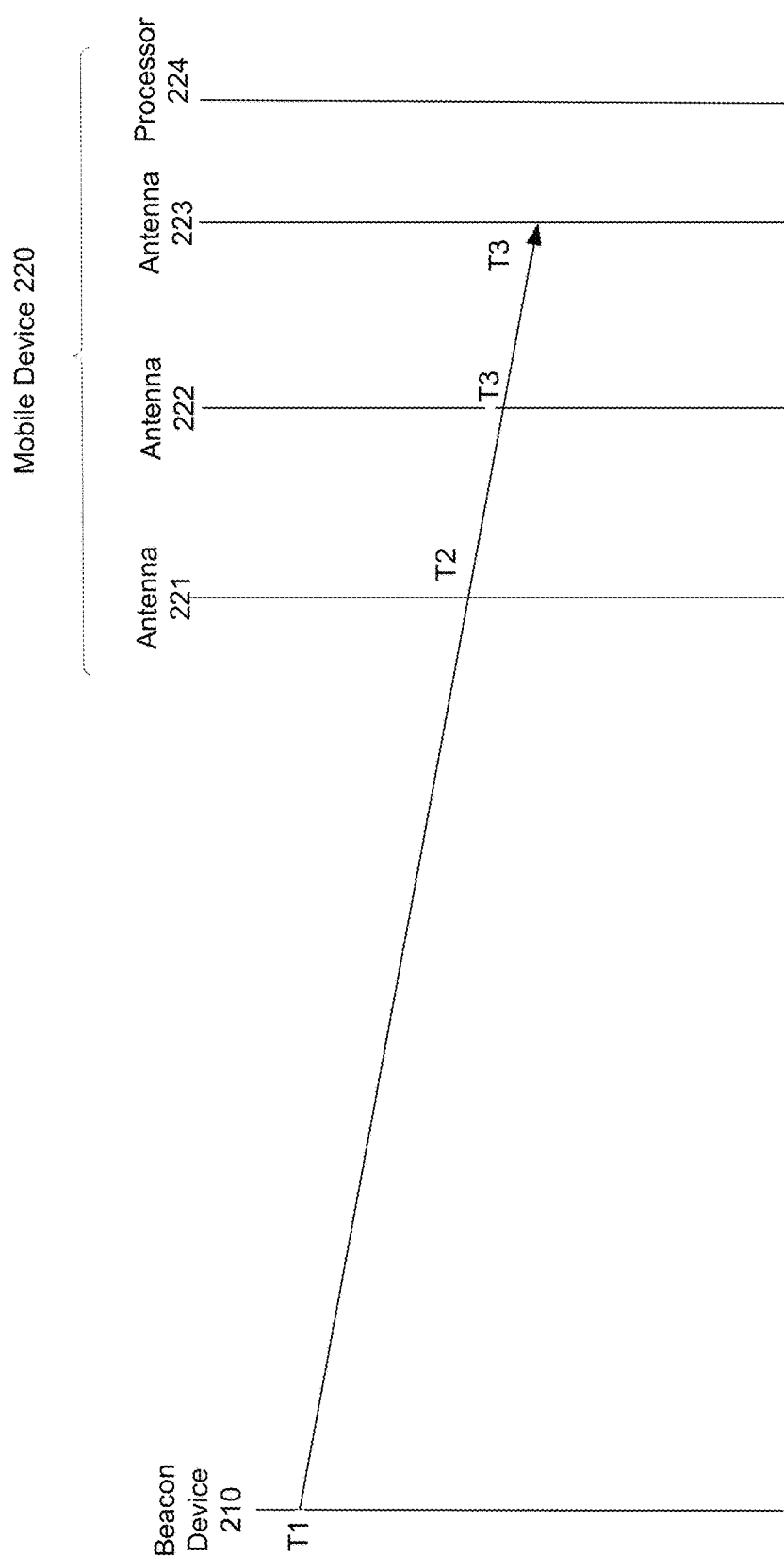
FIG. 2 illustrates a sequence diagram involving a primary device (referred to as a transmitting device or beacon) and a receiving device with a multiple-antenna array.

FIG. 2 shows a sequence diagram 200 of a ranging operation involving a beacon device 210 and a mobile device 220 having three antennas 221, 222, and 223 according to embodiments of the present disclosure. Antennas 221, 222, 223 can be arranged to have different orientations, e.g., to define a field of view for calculating angle of arrival or for performing ranging measurements.

In this example of FIG. 2, each of antennas 221, 222, 223 receives a packet (including one or more pulses) that is transmitted by mobile device 210 (e.g., a beacon). These packets can transfer information to one or more mobile devices 220 such as links to information or ranging requests. The link can be received by the mobile device. In some embodiments, the link can be selected by a user of the mobile device, resulting in information being retrieved from a network via a third wireless protocol to the mobile device. In some embodiments, the link can be a deep link. In the context of the World Wide Web, deep links can be a hyperlink that links to a specific, generally searchable or indexed, piece of web content on a website, rather than the website's home page.

Mobile device 220 can have multiple antennas, which can be used to determine angular information related to an orientation of mobile device 220 relative to beacon device 210. The packets can be received at times T2, T3, and T4, by antennas 221, 222, and 223, respectively. Thus, the antenna(s) (e.g., UWB antennas) of mobile device 220 can listen at substantially the same time. In various embodiments, each of the antennas 221, 222, and 223 can respond independently.

Processor 224 of mobile device 220 can calculate an angle of arrival to the beacon device 210. Processor 224 can receive the time of arrival of the packets from the antennas 221, 222, and 223. The mobile device 220 circuitry (e.g., UWB circuitry) can analyze the received signals from antennas 221, 222, 223. As described later, processor 224 can be an always-on processor that uses less power than an application processor that can perform functionality that is more general. The processor 224 can know the geometry of the three antennas on the phone. The processor 224 can also know the orientation of the mobile device 220 from one or more sensors on the mobile device 220 (e.g., accelerometer, gyroscope, and compass). With the known orientation of the antennas 221, 222, and 223, and the known orientation of the mobile device 220, the processor can use the times of arrival T2, T3, and T4 to calculate an angle of arrive of the packet to the beacon device 210.

Accordingly, a mobile device can have multiple antennas to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian, or polar, where polar coordinates can comprise an angular value and a radial value.

II. Communication Techniques Using a Beacon Device

A beacon device can be used to provide information to one or more mobile devices. Previous techniques may have direct, bi-directional communications between a beacon and the one or more mobile devices. However, these previous techniques utilized complex scheduling schemes to minimize or account for packet collisions between messages in the same frequency band. Bi-directional communication techniques increase the power requirements for the one or more mobile devices because the mobile devices consume more power transmitting one or more messages.

Communication techniques that require direct links are inefficient because of the power and time required for separate communications for multiple devices. The disclosed techniques allow for communication techniques between multiple devices using a single transmitting device (e.g., a beacon). As examples, the transmitting device can comprise a smartphone, a tablet, a wearable device, a laptop, a smart speaker, a wireless hub, or a portable electronic device.

Figure 3:
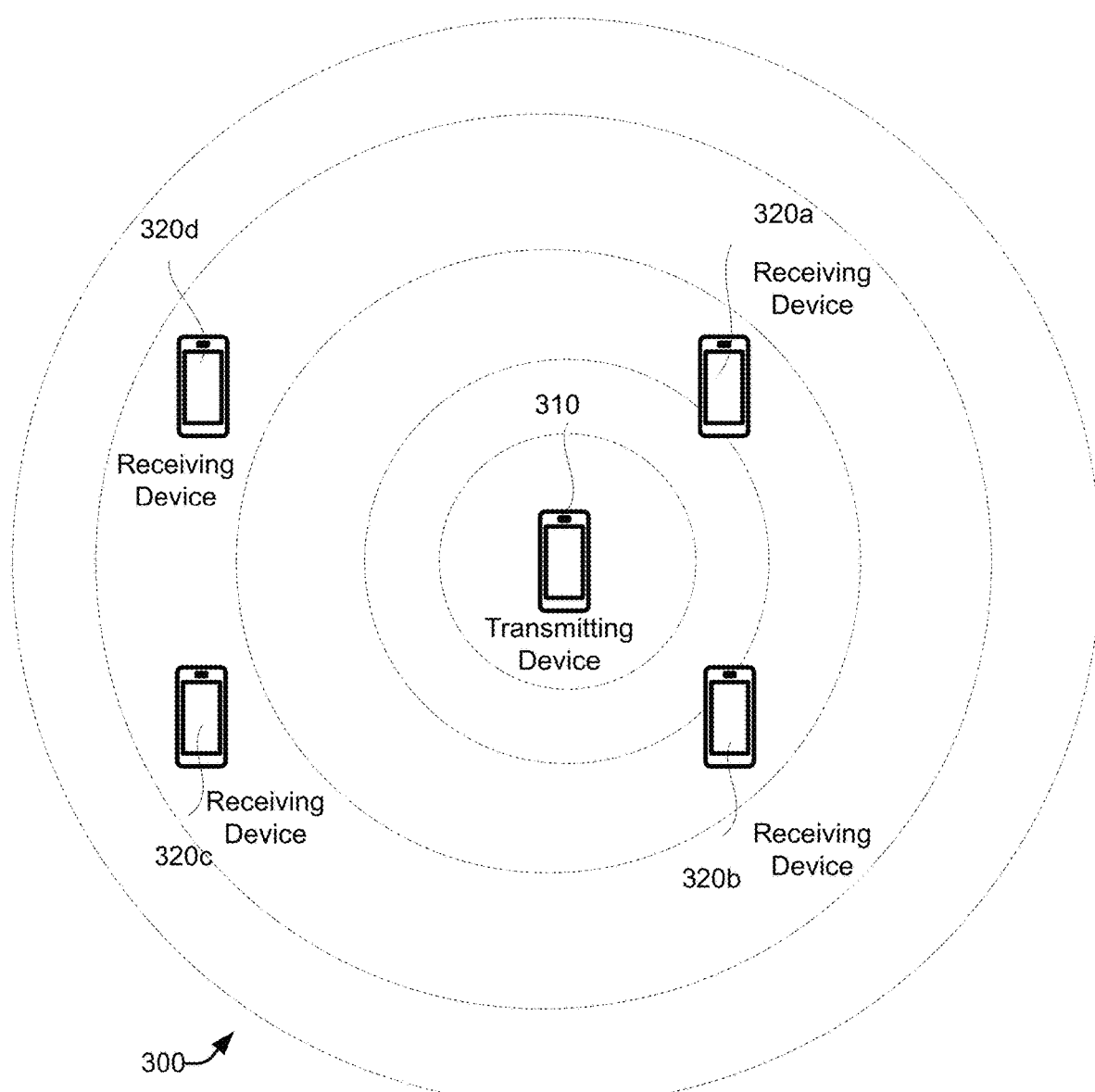
FIG. 3 illustrates schematically an example of one-to-many communication techniques involving a transmitting device and multiple receiving devices.

FIG. 3 illustrates a communication group 300 involving a transmitting device 310 (e.g., a beacon) and multiple receiving devices 320*a*, 320*b*, 320*c*, and 320*d*. The transmitting device 310 may send signals to the secondary devices 320*a*-320*d* to facilitate communication sessions. In various embodiments, the signals can be a low power signal (e.g., Bluetooth Low Energy (BLE). The signals can be used by the receiving devices to determine one or more-time windows for communication of information. The transmitting device 310 can transmit a communication packet that can be received by one or more of the multiple receiving devices 320*a*, 320*b*, 320*c*, and 320*d*. The communication packet can contain information such as links or deep links that the receiving device can use to access information. A link may be as simple a website address. In the context of the World Wide Web, deep links can be a hyperlink that links to a specific, generally searchable or indexed, piece of web content on a website, rather than the website's home page.

As an example, a transmitting device can be attached to or integrated into a signpost for a bus stop. The transmitting device can transmit a communication packet to one or more mobile devices. In various embodiments, a user of the mobile device user would need to point the mobile device within a threshold of the beacon to receive the communication packet. In this way, the user would be able to indicate an interest in the information. The communication packet can include a link to a website that provides the bus schedule, the next scheduled stop, the route, fare information, etc. In some embodiments, a user can orient a receiving device (e.g., a smartphone) toward the post to receive the information regarding the bus.

As another example, a transmitting device can be located at various points around a location (e.g., a museum). The transmitting device can transmit information or links to information about the location or the one or more exhibits at the location. The information or links to the information can be received via a network (e.g., the Internet).

Global navigation satellite systems (GNSS) signals, such as the global positioning system (GPS) signals, can be an important aspect of device-to-device (D2D) communications, as it may be important for the secondary devices 320*a*-320*d* to know the exact location of the primary device 310 and the exact time when the primary device 310 broadcast a message. For example, in case of an emergency, the primary device 310 may broadcast an emergency message to all secondary devices 320*a*-320*d* within a communication range of the primary device 310.

A secondary device 320*a*-320*d* receiving the emergency message may need to know the location of the primary device 110 in order to provide help. The secondary device 320*a*-320*d* may also need to know the time when the emergency message was sent, e.g., in order to determine whether the emergency message is still relevant, to determine whether the transmitting device may have moved, etc. The position information and timing information can be important in other situations. The primary device 310 may maintain position fixes (e.g., in terms of longitude and latitude) and time through satellite signals. The secondary devices may not have position fixes directly through satellite signals.

The communications between the devices can be implemented using frames. A frame can refer to a digital data transmission unit in computer networking and telecommunication. A frame typically includes one or more frame synchronization features comprising a sequence of bits or symbols that indicate to the receiver the beginning and end of the payload data within the stream of symbols or bits it receives.

A. Low Energy Protocols

A passive beacon can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

One of the limitations of BLE is limited data throughput. The data throughput of BLE is limited by the physical radio layer (PHY) data rate, which is the rate at which the radio transmits data. This rate depends on the Bluetooth version used. For Bluetooth 4.2 and earlier, the rate is fixed at 1 megabits per second (Mbps). For Bluetooth 5 and later, however, the rate varies depending on the mode and PHY used. The rate can be 1 Mbps like earlier versions, or 2 Mbps when utilizing the high-speed feature. Another limitation of BLE is the limited range. Bluetooth Low Energy (and Bluetooth in general) was designed for short-range applications and hence the range of operation is limited. There are a few factors that limit the range of BLE. The factors include that BLE operates in the 2.4 GHz Industrial, Scientific, and Medical (ISM) spectrum which is greatly affected by obstacles that exist all around us such as metal objects, walls, and water (especially human bodies). Other factors include performance and design of the antenna of the BLE device, physical enclosure of the device, and device orientation.

BLE requires a gateway for Internet connectivity. In order to transfer data from a BLE-only device to the Internet, another BLE device that has an IP connection is needed to receive this data and then, in turn, relay it to another IP device (or to the Internet).

In the advertising state, a device sends out packets containing useful data for others to receive and process. The packets are sent at a fixed interval defined as the Advertising Interval. The interval can be random or pseudo-random. There are 40 RF channels in BLE, each separated by 2 MHz (center-to-center). Three of these channels are called the Primary Advertising Channels, while the remaining 37 channels are used for Secondary Advertisements and for data packet transfer during a connection. Advertisements can start with advertisement packets sent on the three Primary Advertising Channels (or a subset of these channels). This allows centrals to find the Advertising device (Peripheral or Broadcaster) and parse its advertising packets. The central can then initiate a connection if the advertiser allows it (e.g., peripheral devices).

B. Ultra-Wideband Packet Transmissions

Ultra-Wide Band transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 gigahertz (GHz) ISM band, each separated by 2 megahertz (MHz). Bluetooth defines two transmission types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests can correspond to stage 1 and ranging responses can correspond to stage 2. Such use of an indicator may be helpful when more than two devices are performing ranging operations in near each other.

The narrow pulses (e.g., ~ one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

Mobile devices may use Global Navigation Satellite Systems (GNSS) (e.g., Global Positioning System (GPS)) or other location circuitry to determine the location of the mobile device. For example, a map application can show an approximate location of the mobile device on a map. However, such techniques for determining location are typically determined relative to some external reference frame that is fixed, and not to a variable reference frame, e.g., another mobile device. Additionally, GNSS systems can be limited indoors or in areas of blocked signals (e.g., dense urban environments) or suffer from inaccuracies from reflected signals. Further the standard accuracy for GPS systems is currently 4 meters for horizontal accuracy and worse for vertical accuracy. Enhanced communication techniques can allow for information exchanges that allow for angular determination, ranging, and information exchanges between electronic devices.

Figure 4:
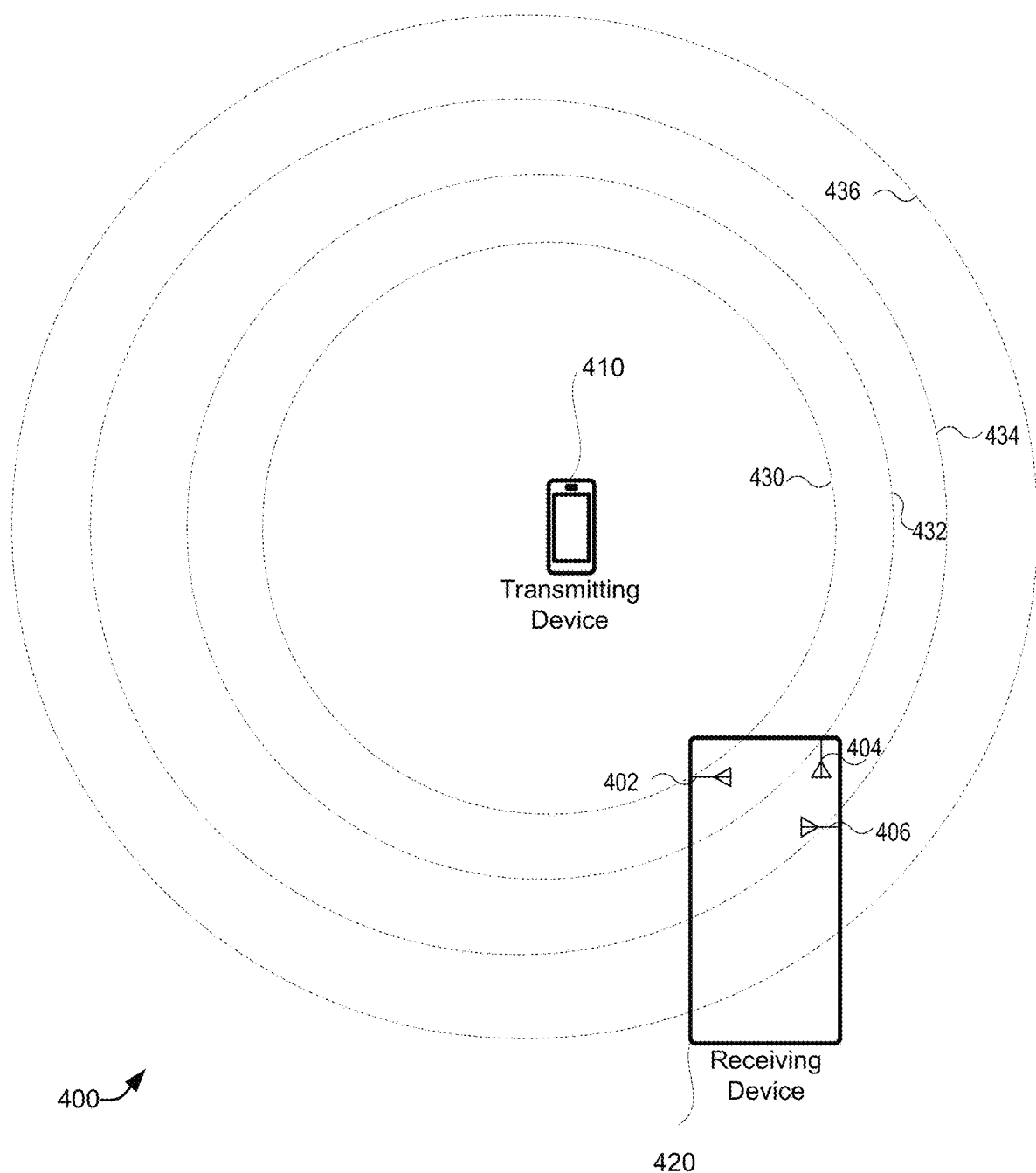
FIG. 4 illustrates a one-to-many communication group involving a primary device (referred to as a transmitting device or beacon) and a receiving device with a multiple-antenna array.

FIG. 4 illustrates a one-to-many communication group 400 involving a transmitting device 410 (e.g., a beacon) and a receiving device 420. The receiving device 420 can have a plurality of antennas in different orientations mounted on the receiving device 420. For example, a first antenna 402, a second antenna 404, a third antenna 406 can be installed on the receiving device 420. The antenna configuration shown in FIG. 4 is merely exemplary and other antenna array configurations with various number, location and orientations of antennas can be employed.

The transmitting device 410 can transmit messages that travel in an omnidirectional manner. FIG. 4 illustrates the position of the transmission packet at various points in time. At a first time $t_1$ the transmission packet is a first range 430 from the transmitting device 410. At a second time $t_2$ the transmission packet is a second range 432 from the transmitting device 410. At a third time $t_3$ the transmission packet is a third range 434 from the transmitting device 410. At a fourth time $t_4$ the transmission packet is a fourth range 436 from the transmitting device 410.

The transmission packet can be received by the different antennas 402, 404, 406 of the receiving devices 420 at different times ($t_1$, $t_2$, $t_3$). Based on the depicted orientation, the first antenna 402 would receive the transmission packet first at time $t_1$, followed by the second antenna 404 at time $t_2$, and finally the third antenna 406 at time $t_3$. The receiving device 420 can use the different reception times at the different antennas to calculate an angle of arrival from the receiving device 420 to the transmitting device 410 transmitting device 410.

Figure 5:
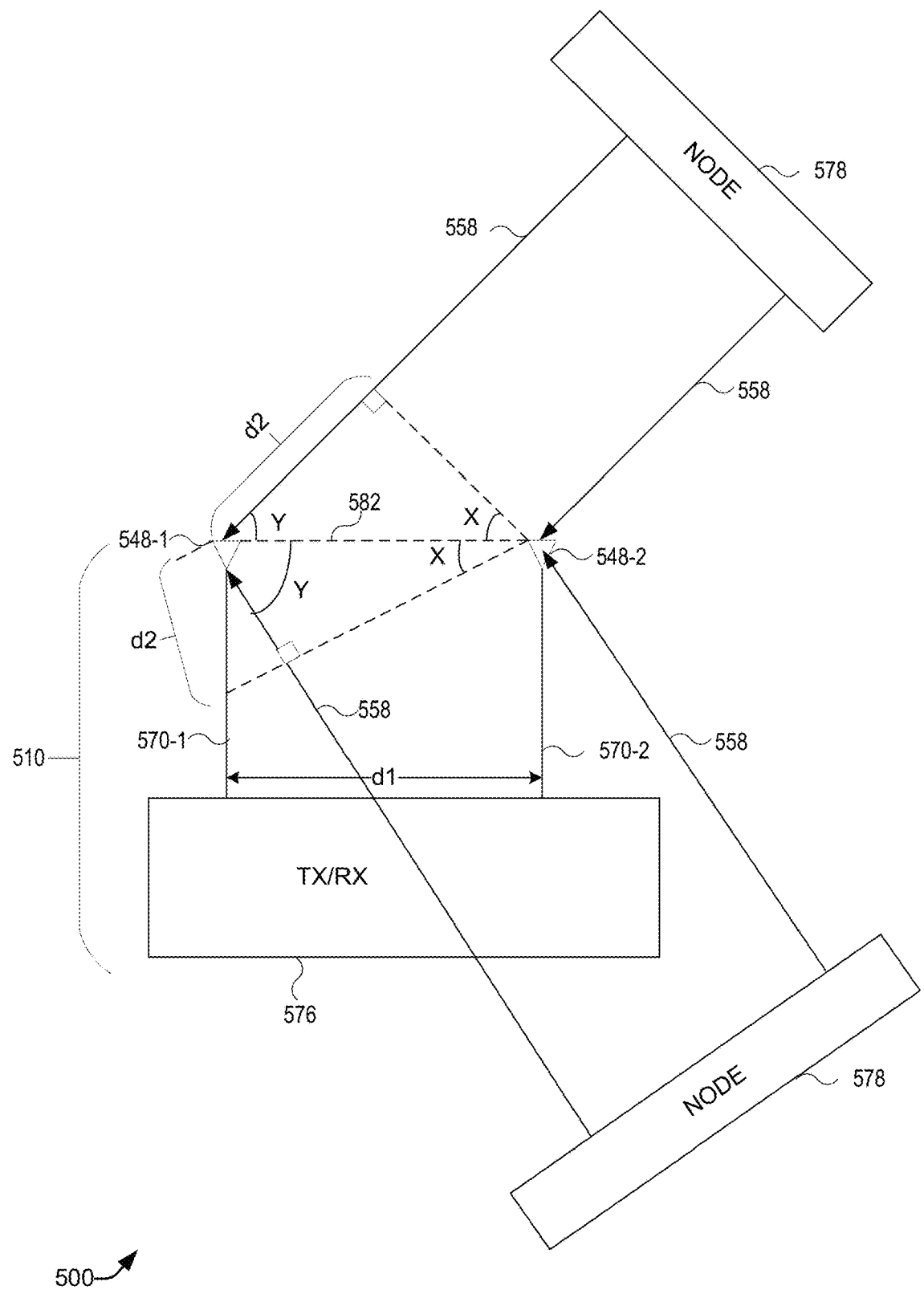
FIG. 5 is a schematic diagram showing how angle of arrival measurement techniques may be used to determine the orientation of device relative to nodes.

FIG. 5 is a schematic diagram 500 showing how angle of arrival measurement techniques may be used to determine the orientation of device 510 relative to nodes 578. The term "node" may be used to refer to an electronic device, an object without electronics, and/or a particular location. In some arrangements, nodes may be associated with a mapped environment (e.g., the term node may refer to a device, object, or location in a mapped environment). Devices 510 may have control circuitry that determines where other nodes are located relative to device 510. The control circuitry in device 510 may synthesize information from cameras, motion sensors, wireless circuitry such as antennas, and other input-output circuitry to determine how far a node is relative to device 510 and/or to determine the orientation of device 510 relative to that node. The control circuitry may use output components in device 510 to provide output (e.g., display output, audio output, haptic output, or other suitable output) to a user of device 510 based on the position of the node. The control circuitry may, for example, use antenna signals and motion data to determine the angle of arrival of signals from other electronic devices to thereby determine the locations of those electronic devices relative to the user's electronic device.

As shown in FIG. 5, electronic device 510 may include multiple antennas (e.g., a first antenna 548-1 and a second antenna 548-2) coupled to transceiver circuitry 576 by respective transmission lines 570 (e.g., a first transmission line 570-1 and a second transmission line 570-2). Antennas 548-1 and 548-2 may each receive a wireless signal 558 from node 578. Antennas 548-1 and 548-2 may be laterally separated by a distance d1, where antenna 548-1 is farther away from node 578 than 548-2 (in the example of FIG. 5). Therefore, wireless communications signal 558 travels a greater distance to reach antenna 548-1 than 548-2. The additional distance between node 578 and antenna 548-1 is shown in FIG. 5 as distance d2. FIG. 5 also shows angles x and y (where x+y=90°).

Distance d2 may be determined as a function of angle γ or angle x (e.g., d2=d1 sin(x) or d2=d1 cos(y)). Distance d2 may also be determined as a function of the phase difference between the signal received by antenna 548-1 and the signal received by antenna 548-2 (e.g., d2=(Δϕλ)/(2π), where Δϕ is the phase difference between the signal received by antenna 548-1 and the signal received by antenna 548-2 and λ is the wavelength of the received signal 558). Electronic device 510 may have phase measurement circuitry coupled to each antenna to measure the phase of the received signals and identify a difference in the phases (Δϕ). The two equations for d2 may be set equal to each other (e.g., d1 sin(x)=(Δϕλ)/(2π)) and rearranged to solve for angle x (e.g., x=sin−1 (Δϕλ)/(2πd1)) or may be rearranged to solve for angle γ. As such, the angle of arrival may be determined (e.g., by control circuitry) based on the known (predetermined) distance between antennas 548-1 and 548-2, the detected (measured) phase difference between the signal received by antenna 548-1 and the signal received by antenna 548-2, and the known wavelength or frequency of the received signals 558.

Distance d1 may be selected to ease the calculation for phase difference between the signal received by antenna 548-1 and the signal received by antenna 548-2. For example, d1 may be less than or equal to one half of the wavelength (e.g., effective wavelength) of the received signal 558 (e.g., to avoid multiple phase difference solutions).

Some antenna arrangements may be sufficient for resolving the "complete" angle of arrival of signals 558 without ambiguity. A complete angle of arrival (sometimes referred to as the direction of arrival) includes an azimuth angle θ and an elevation angle γ of node 578 relative to device 5.

Antennas that are located in a three-dimensional arrangement (e.g., spanning multiple planes) may be sufficient to determine the complete angle of arrival of signals 558 without ambiguity. However, when the baseline vectors (i.e., the vectors that extend between respective pairs of antennas) are all located in one plane, there may be some ambiguity as to the correct azimuth angle θ and/or the correct elevation angle γ of signals 558. In the two-antenna arrangement of FIG. 5, for example, there is only one baseline vector 582, which yields an accurate, unambiguous azimuth angle θ, but may not provide sufficient information to determine elevation angle φ. Thus, node 578' with a different elevation angle may nonetheless produce signals 558' with the same phase difference Δϕ between the signal received by antenna 548-1 and the signal received by antenna 548-2 as signals 558. In other words, different directions of arrival may result in the same phase difference. This leads to an ambiguity in the angle of arrival solution. Without other information, control circuitry may be able to determine the azimuth angle θ of signals 558 but may be unable to determine elevation angle γ of signals 558. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 510 is in multiple different positions. At each position, antennas 548 may receive signals 558 from node 578 and control circuitry may determine the possible angle of arrival solutions based on the phase difference between signals received by antenna 548-1 and signals received by antenna 548-2. Motion sensor circuitry may track the movement of device 510 as it is moved from one position to another. Using the motion data from motion sensor circuitry, control circuitry may associate each set of angle of arrival solutions with a different baseline vector 582. The baseline vectors may span multiple planes, thus providing sufficient information for control circuitry to determine the correct angle of arrival, just as if device 510 had a multi-planar antenna arrangement.

It should be understood that using a horizontal coordinate system and representing the complete angle of arrival with azimuth and elevation angles is merely illustrative. If desired, a Cartesian coordinate system may be used, and the angle of arrival may be expressed using a unit direction vector that is represented using x, y, and z coordinates. Other coordinate systems may also be used. A horizontal coordinate system is sometimes described herein as an illustrative example.

III. Beacon Communication Techniques Use Cases

In various embodiments, the beacon communication techniques can be used to provide information to receiving devices based on a positioning of the receiving device. In this way, the user(s) of the one-to-many receiving devices can indicate an interest in the information prior to receiving the information from the transmitting device. Pre-existing location-based services may provide advertising to receiving devices based on location, but this can be undesirable and unwanted by users because location alone may not indicate interest by the user.

A. Single Beacon

Figure 6:
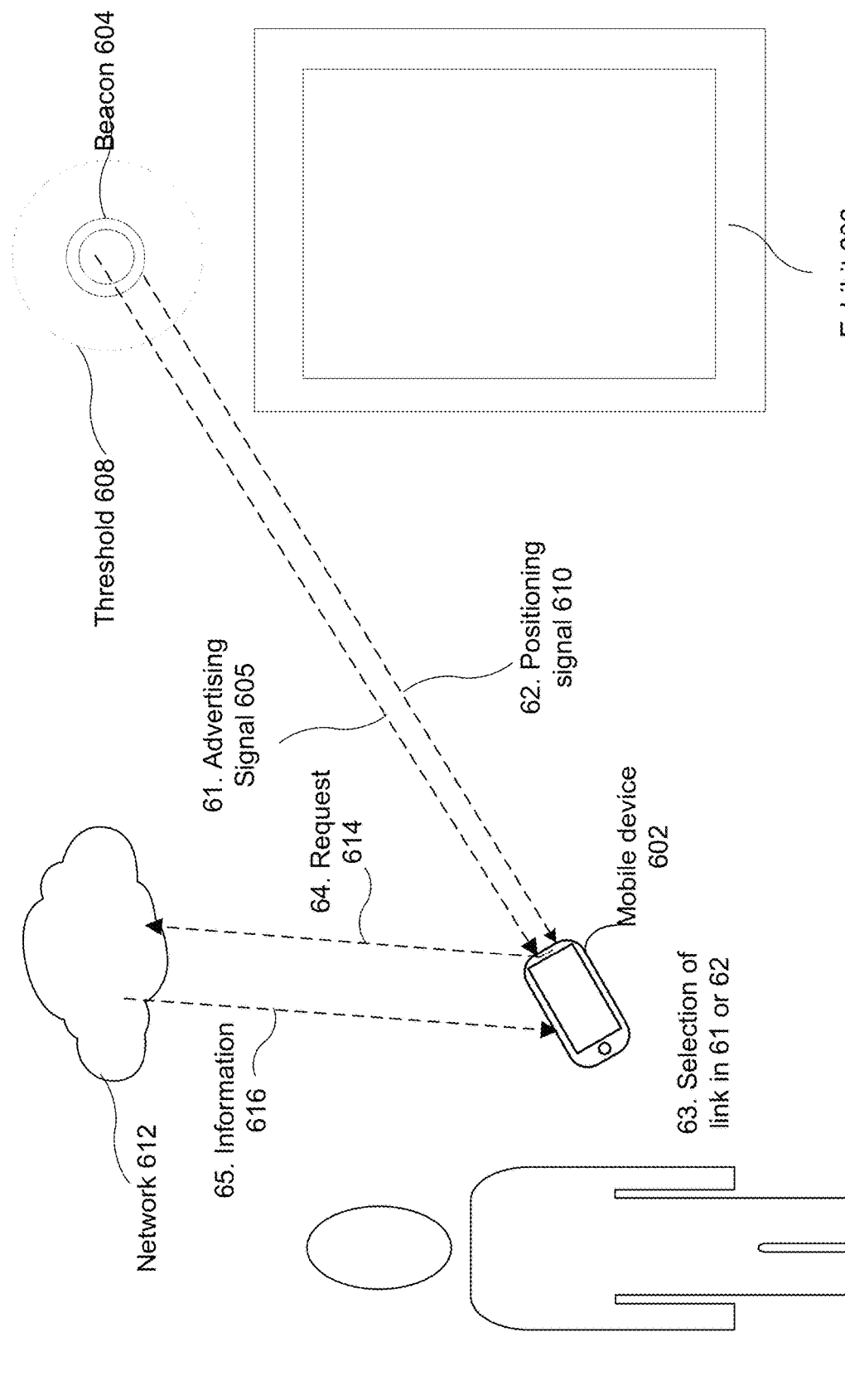
FIG. 6 illustrates a communication technique using a passive beacon in a museum setting.

FIG. 6 illustrates an exemplary use case of beacon communication techniques. In the case a beacon 604 can be installed in a location. In various embodiments, the beacon 604 can be installed in the vicinity of an exhibit 606. In FIG. 6, the beacon is installed above the exhibit, but the disclosure is not so limited as the beacon can be quite small. The beacon 604 can be installed in any orientation around or behind an exhibit. In the exemplary use case, a user 600 can orient their mobile device 602 toward the beacon 604. In various embodiments, the mobile device 602 can be pointed at the beacon 604 or within a threshold 608 around the beacon 604.

The beacon 604 can transmit one or more wireless signals. The beacon 604 can transmit, at 61, a first wireless signal (e.g., an Advertising signal 605). The wireless signals can be received by the mobile device 602. The first wireless signal can be used to determine a listening window for receiving, at 62, a second wireless signal (e.g., positioning signal 610).

The beacon 604 can transmit, at 62, positioning data 610 (e.g., a link) to the mobile device 602. In various embodiments the advertising signal 605 can include a link. The user 600 can select, at 63, the link in either the advertising signal 605 or the positioning data 610. By selecting, at 63, the link, the mobile device 602 can transmit, at 64, a request 614 for information 616 to a network 612. The network 612 can transmit, at 65, the information 616 from a network 612 (e.g., the Internet) via a third wireless protocol.

The mobile device 602 can calculate an angle of arrival of the wireless signals from the beacon 604. If the angle of arrive is within a threshold, the processor of the mobile device 602 can determine it is within a threshold of the beacon 604. If the mobile device 602 is within the threshold angle of arrival, the processor can make the determination that the user 600 is pointing the mobile device 602 towards the beacon 604 thereby signaling and interest in the information that can be provided by the beacon 604. The angle of arrival can be calculated with respect to an orientation of the mobile device 602. In one example, the beacon 604 transmits an information packet over a wireless protocol. The mobile device 602 can determine when the information packet will be transmitted via a first wireless advertising signal from the beacon 604. The mobile device 602 can listen for the information packet during the calculated listening window.

Figure 7:
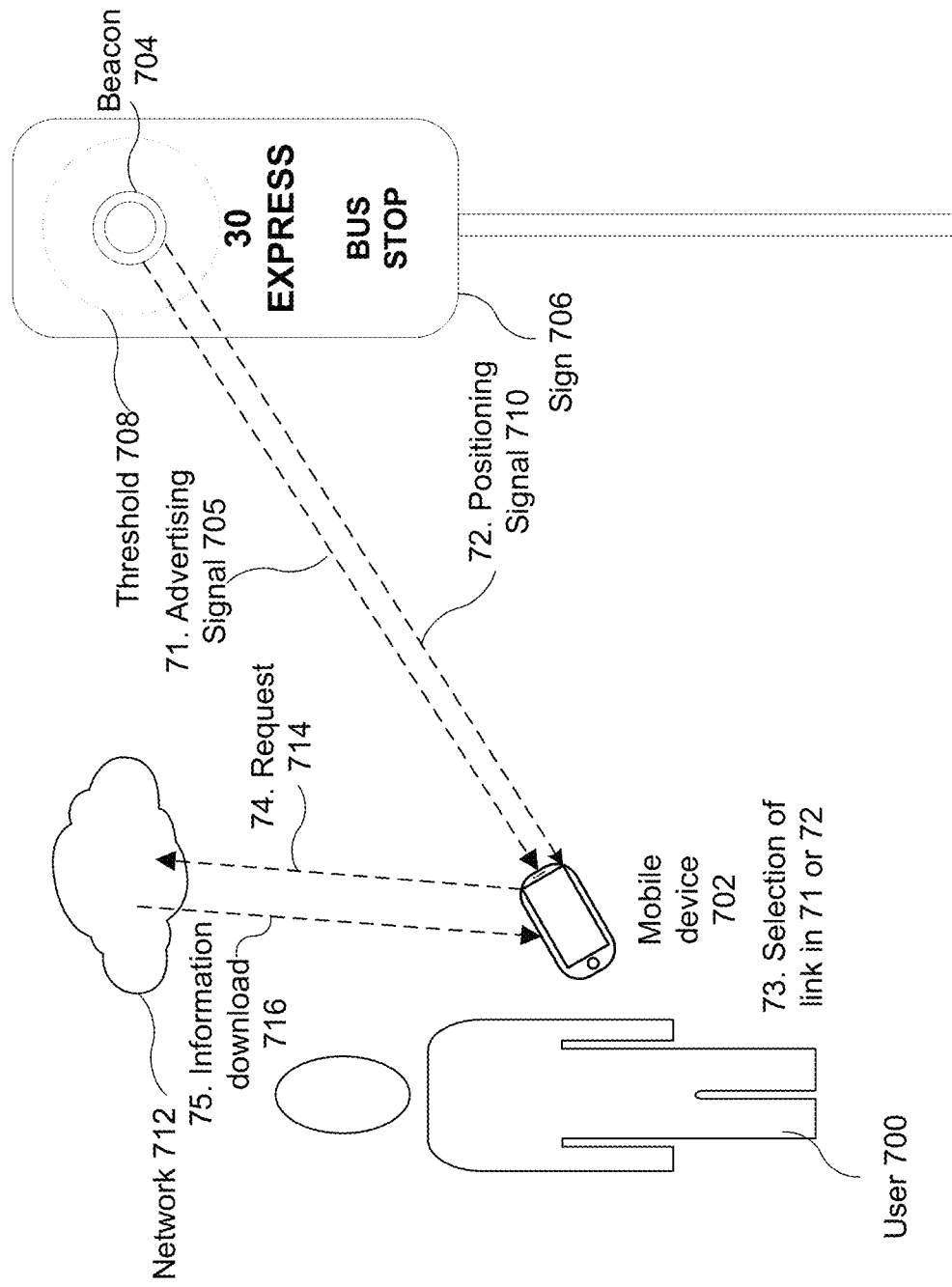
FIG. 7 illustrates a communication technique using a passive beacon at a transportation location (e.g., a bus stop).

FIG. 7 illustrates another exemplary use case in which a beacon device 704 can be installed in a sign 706 for transportation (e.g., a bus stop). As depicted in FIG. 7 a beacon device 704 is installed in a sign 706 for a bus stop, here the N79 bus route. A user 700 can orient a mobile device 702 toward the sign/beacon device 704. The processor in the mobile device 704 can receive an angle of arrival of wireless signals transmitted from the beacon device 704. If the mobile device 704 is oriented within a threshold 708 of the beacon device 704, the processor of the mobile device 702 can detect that the mobile device 702 is pointed toward the beacon device 704 thereby indicating some interest in the information that can be provided by the beacon device 704.

At a predetermined time interval, the beacon device 704 can transmit information over a wireless protocol. The interval can be random or pseudo-random. The beacon device 704 can transmit, at 71, a first wireless signal (e.g., an Advertising signal 705). The first wireless signal can be used to determine a listening window for receiving, at 62, a second wireless signal (e.g., link data 710). The first wireless signal can be used to determine a listening window for receiving, at 72, a second wireless signal (e.g., link data 710). The angle of arrival can be calculated with respect to an orientation of the mobile device 702. In one example, the beacon device 704 transmits an information packet over a wireless protocol. The mobile device 702 can determine when the information packet will be transmitted via a first wireless advertising signal from the beacon device 704. The mobile device 702 can listen for the information packet during the calculated listening window.

The beacon device 704 can transmit, at 72, positioning data 710 (e.g., a link) to the mobile device 702. In various embodiments the advertising signal 705 can have a link. The user 700 can select, at 73, the link in either the advertising signal 705 or the positioning data 710. By selecting, at 73, the link, the mobile device 702 can transmit, at 74, a request 715 for information to a network 712. The network 712 can transmit, at 75, the information 716 from a network 712 (e.g., the Internet).

The beacon device 704 can transmit, at 71, link data 710 (e.g., a deep link) to the mobile device 702. The user 700 can use the link data 710 to receive, at 73, information 714 from a network 712 (e.g., the Internet). The information 714 can include a bus schedule, time or next bus, bus fare information, or other transit information.

While the example in FIG. 7 illustrates a bus stop other embodiments can be considered such as a train stop, trolley stop, subway stop, or shuttle stop. In various embodiments, the beacon can be embedded in a wall, platform, or an overhead sign at a location. In various embodiments, the beacon device 704 can be embedded in the transportation mode itself (e.g., the bus, the train car, the subway car, the shuttle).

In other embodiments, the beacon communication techniques can be used for an audio tour of a museum. The transmitting devices can provide information concerning one or more exhibits throughout the museum. Multiple transmitter devices can be used in triangulation techniques for precise position locating at locations (e.g., indoor, or dense urban environments) for receiving devices where GNSS systems may be unavailable or unreliable. In various embodiments, a receiving device can be carried using a lanyard case to maintain the orientation of the receiving device. By maintaining the orientation in a predictable manner, the angle of arrival information can be useful for orientation.

The transmitting devices (e.g., beacons) can be used at various businesses, on public transportation (e.g., buses, trains, trolleys), or at exhibits in a museum. For example, a transmitting device can transmit information concerning the business (e.g., operating hours, a menu, review, or Yelp information for a business like a restaurant).

In various embodiments, receiving devices (e.g., beacons) can be installed by a city or municipality using open standard. In this way, apps can be registered with these receiving devices. In various embodiments, applications on the receiving devices can display information concerning these transmitting devices or information provided by these transmitting devices.

In various embodiments, the passive beacon communication techniques can be used for application data handoff. For example, a user can watch a video on a smartphone (receiving device) and by pointing the smartphone at a laptop, as a transmitting device, the video can be transferred to the laptop from the smartphone. Similar handoffs can be accomplished between other device such as between a smartphone and a smart speaker, a wearable device to a smartphone or other smart device.

In various embodiments, the passive beacon communication techniques can be used for point of sale. For example, merchants at remote locations can use transmitting devices to allow customers to engage with payment or sales with the merchant. In some embodiments, if a receiving device is within a threshold, the receiving device can present a payment screen to the customer.

A user of one mobile device may want to share data (e.g., a video or audio file) to another user. The user could attach a file to an email and send, but this can be slow and expose the data to a network. Thus, it may be advantageous to send the data directly to the other device, e.g., using Bluetooth or Wi-Fi direct (also called peer mode or ad-hoc mode), or at least only through a local access point/router. For example, the user's device can detect other nearby devices and display them as options for sharing the data.

Sharing data in this manner can be problematic when there are multiple devices nearby. For example, if two people (i.e., sender and receiver) are in a crowd, the discovery process can identify multiple devices. If multiple devices are displayed as options, their icons can be difficult to display on a single screen, thereby causing frustration to a user, who wants to select a friend's device quickly. It is possible to only display icons of other devices that show up in a contact list of the sending device. This can limit the number of devices shown as options for sending the data. However, such a requirement can limit the ability to share data to a new person. In addition, the requirement of being in the contact list does not address when a user is among many friends, coworkers, etc., where all or many of them are in the contact list. Embodiments can use ranging to facilitate this process.

B. Multiple Beacons

Figure 8:
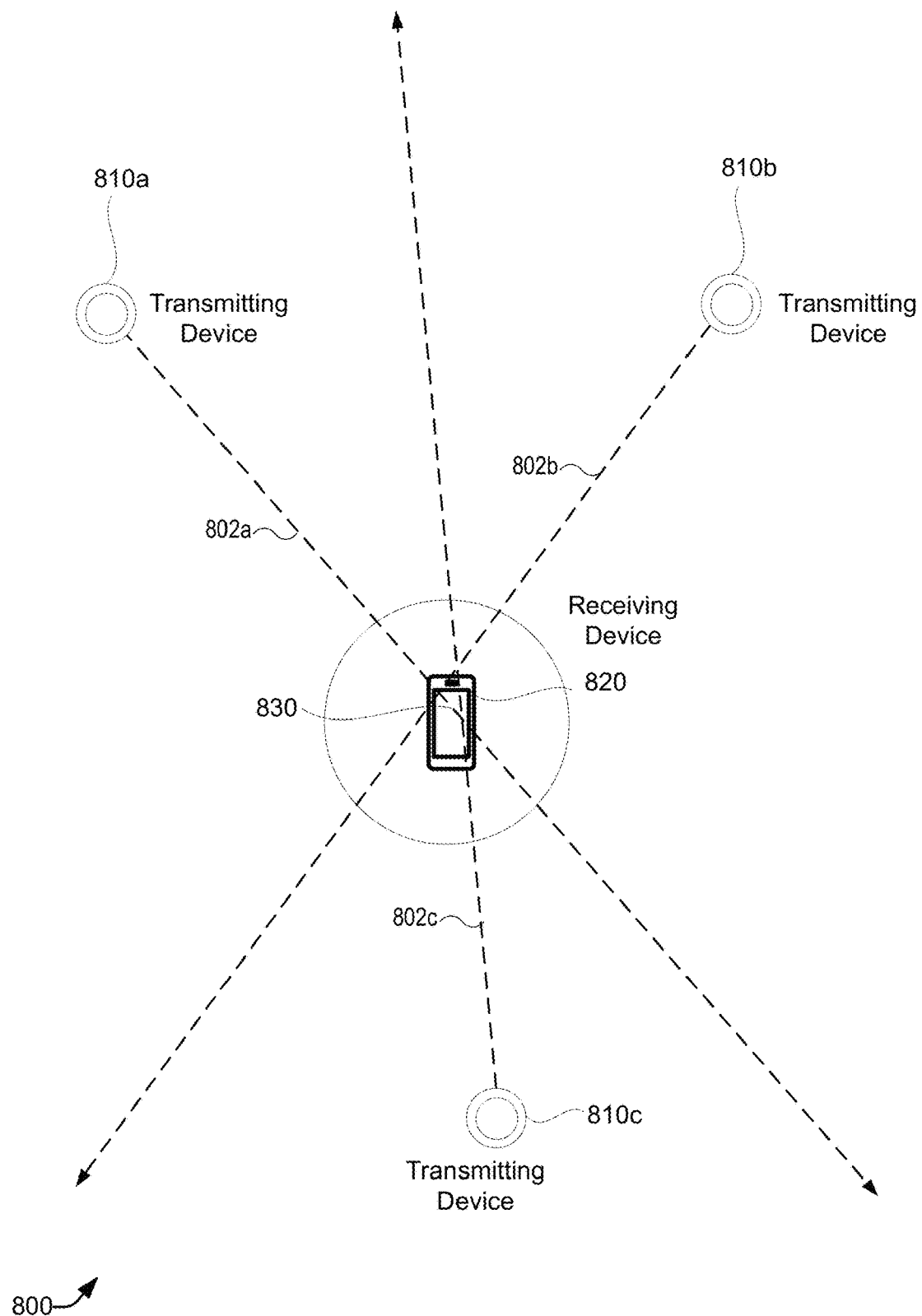
FIG. 8 illustrates a positioning technique using multiple passive beacons.

FIG. 8 illustrates a passive beacon communication group 800 involving multiple transmitting devices 810a, 810b, 810c and a receiving device 820. Although three transmitting devices 810a, 810b, 810c are illustrated in FIG. 8, other combinations, configurations, and arrangements can be considered. For various embodiments for passive calculation of location, two transmitting devices can be used. Although one receiving device 820 is illustrated, multiple receiving devices can be used in passive beacon communication techniques. In various embodiments, the transmitting devices 810a, 810b, and 810c can be positioned throughout a given environment (e.g., an indoor layout of a museum).

Each of the multiple transmitting devices 810a, 810b, 810c can generate and transmit ranging information packets. In various embodiments the information packets can be ranging packets. In various embodiments, the multiple transmitting devices 810a, 810b, 810c are at a known geographic position or location (e.g., a location within an exhibit hall).

In various embodiments, the receiving device 820 can receive one or more information packet transmissions 802a, 802b, 802c from the transmitting devices 810a, 810b, 810c. The receiving device 820 can calculate an angle of arrival for each of the information packet transmissions 802a, 802b, 802c (using techniques previously described).

In various embodiments, the angles of arrival to each of the transmitting devices can be used to calculate a probable location or an area of probability 830 for the location of the receiving device 820. In this way, the receiving device 820 can passively receive information from the transmitting devices 810a, 810b, 810c to calculate a precise location of the receiving device 820 even if indoors or an area without GNSS coverage.

IV. Passive Beacon Communication Scheduling

In some embodiments, a transmitting device can perform the function of a beacon. The electronic device can be a cell phone, a smartphone, tablet, or similar potable electronic device. The beacon can be fixed or stationary.

Figure 9:
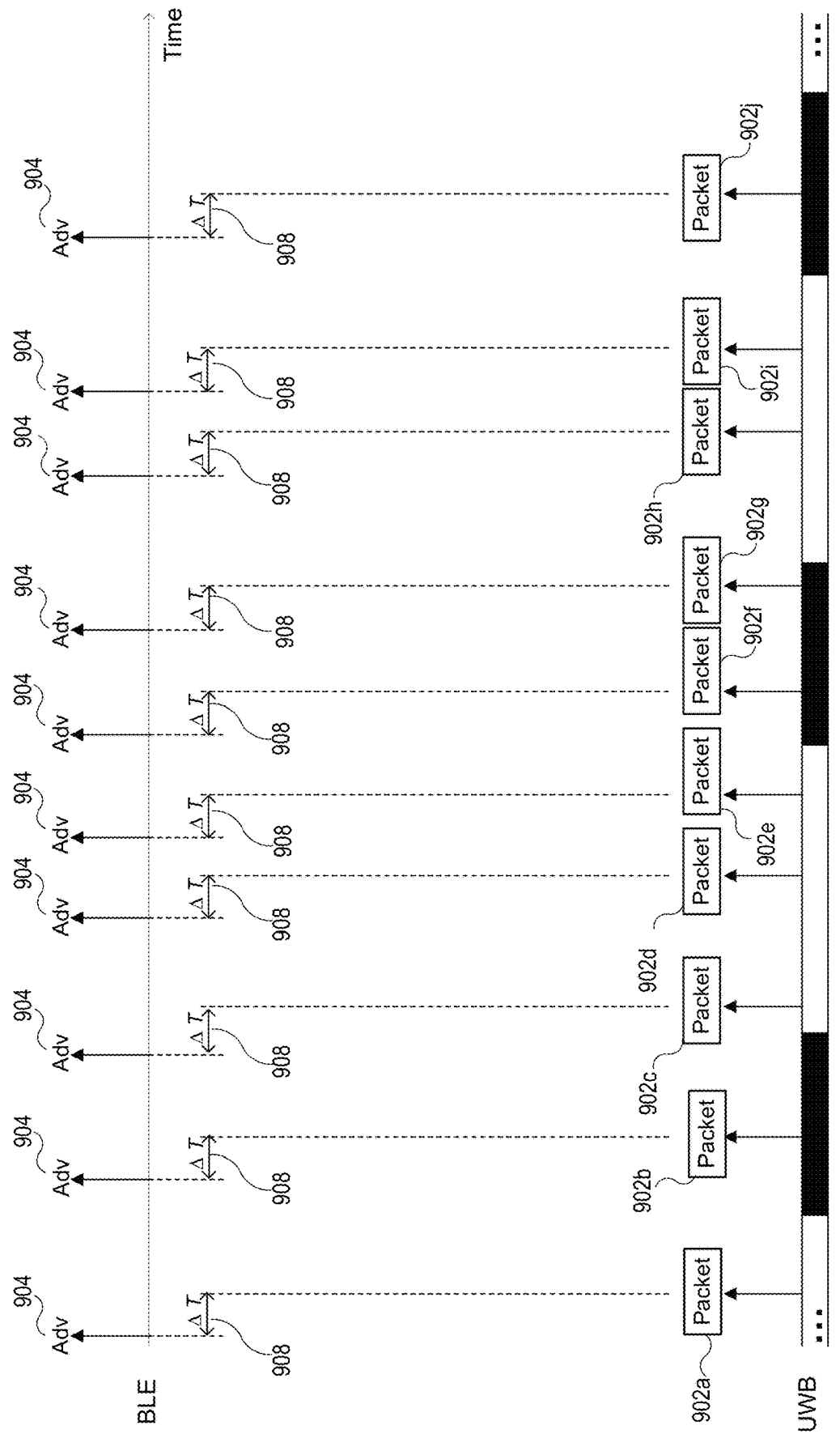
FIG. 9 illustrates an exemplary sequence diagram for passive beacon communication techniques.

FIG. 9 illustrates an exemplary depiction of a timeline 900 for using the Bluetooth low energy (BLE) advertisement signals to synchronize the timing for transmission of UWB packets. FIG. 9 illustrates a timeline 900 for transmission of multiple signals (e.g., UWB signals and BLE signals) from a single device. A transmitter device can transmit a UWB packets 902a-902j at an irregular schedule. The transmitter device can also transmit BLE advertisements 904 in a separate band to notify other devices when to listen for the next UWB packet 902a-902j transmissions. For example, the BLE advertisements 904 can be transmitted approximately every 30 milliseconds. The BLE advertisements 904 can be transmitted irregularly to avoid collisions between data packets. Thus, BLE advertisements 904 can be transmitted at a predetermined interval (e.g., every 30 seconds) plus some random delay of 0 to 10 milliseconds. This provides random dithering between advertisements. The transmitter device can transmit a UWB packet 902a-902j at a fixed time interval ($\Delta T$) 908 following the transmission of the BLE advertisement 904. The time interval ($\Delta T$) 908 can be predetermined so the receiving device can know to listen for the UWB packet 902a-902j after a predetermined time after transmission of the BLE advertisement 904.

In other embodiments, for each time slot there can be a different BLE advertisement signal 904 and different UWB packets 902a-902j for that specific timeslot to synchronize the timing between the transmitting device and the receiving device in the timeslot.

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology. Ranging techniques between multiple devices can be challenging due to scheduling the transmission of ranging request messages, response messages, and acknowledgement messages on the same channel so that collisions between these messages are minimized or avoided. These techniques can be better understood with a brief explanation of ranging techniques for mobile device.

V. Communication Techniques Flow—Transmitting Device

Figure 10:
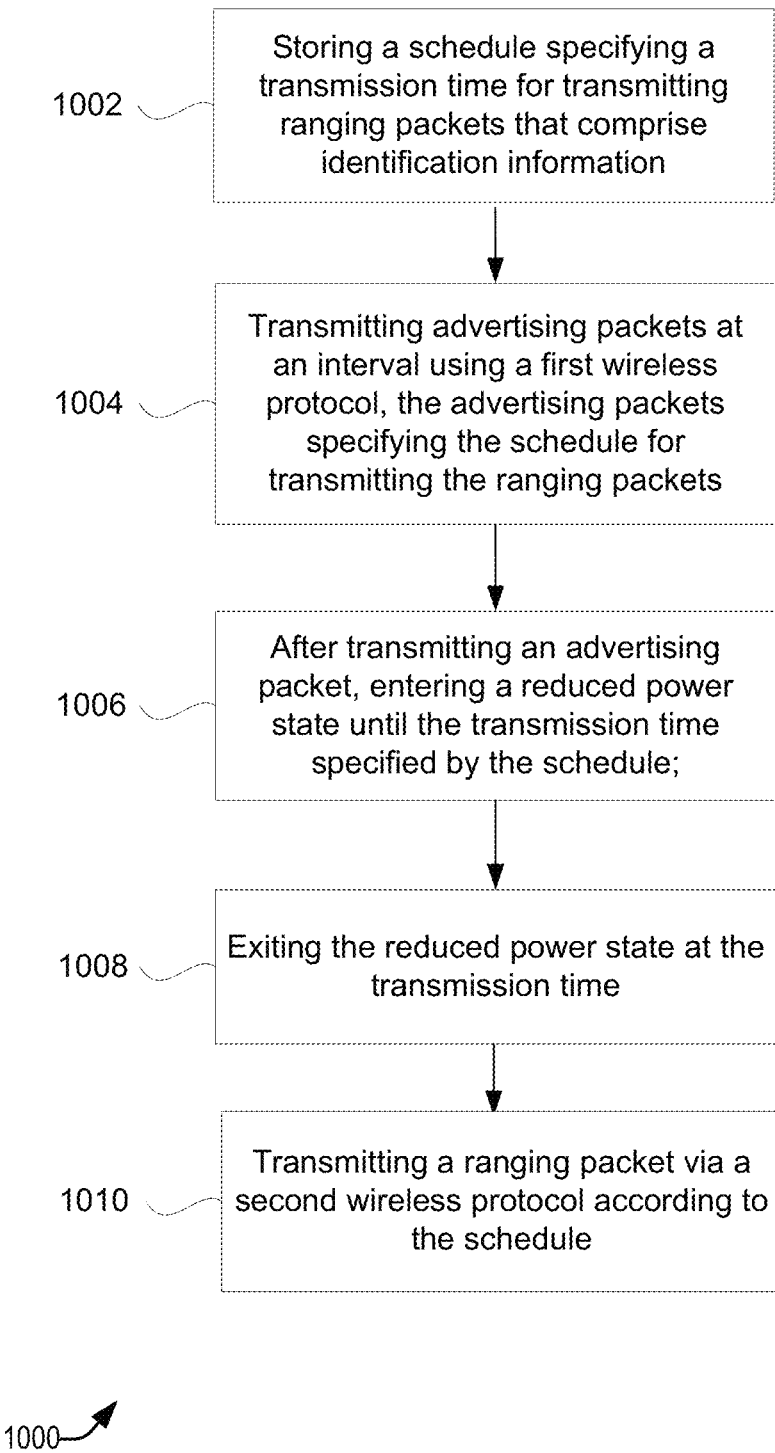
FIG. 10 illustrates an exemplary flowchart for a communication technique performed by a transmission device.

FIG. 10 illustrates an exemplary flowchart for a communication technique performed by a computing device. Method 1000 can be used to determine a spatial relationship of other devices to the beacon. Method 1000 can be performed by any device that acts as a transmitting device.

At 1002, the technique can include storing a schedule at the transmitting device. The schedule can specify a transmission time for transmitting ranging packets. The ranging packets can include identification information for the transmitting device. The transmitting device can signal the transmission of the ranging packets by using a first wireless, low power protocol transmissions (e.g., Bluetooth Low Energy). The schedule can be transmitted by the first wireless protocol. In some embodiments, the ranging packet transmission can occur a predetermined time (ΔT) after transmission of the first wireless protocol. In some embodiments, the schedule can be hard coded in one or more receiving devices.

At 1004, the technique can include transmitting advertising packets at an interval using a first wireless protocol, the advertising packets specifying the schedule for transmitting the ranging packets. The interval can be random or pseudo-random. In various embodiments, the advertising packets can be transmitted via a low-power protocol (e.g., Bluetooth Low Energy). In various embodiments, the transmission schedule for the advertising packets can be transmitted randomly or pseudo randomly. The one or more receiving devices can receive the advertising packets. In various embodiments, the advertising packets can include information concerning the identity of the transmission device. In some embodiments, the advertising packets can include the schedule for transmission of ranging packets. The one or more receiving device can use the advertising packets as a timing signal to calculate a transmission time for ranging packets.

At 1006, the technique can include after transmitting an advertising packet, entering a reduced power state until the transmission time specified by the schedule. The reduced power state enables the transmitting device to reduce power consumption between transmission cycles.

At 1008, the technique can include exiting the reduced power state at the transmission time. In some embodiments, the transmitting device can exit the reduced power state a predetermined time prior to the transmission time as determined by the schedule.

At 1010, the technique can include transmitting a ranging packet via a second wireless protocol according to the schedule. The second wireless protocol can be an ultra-wideband protocol. The ranging packet can include identification information for the transmitting device.

It should be appreciated that the specific steps illustrated in FIG. 10 provide particular techniques for passive beacon communication techniques according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

VI. Communication Techniques—Receiving Devices

Figure 11:
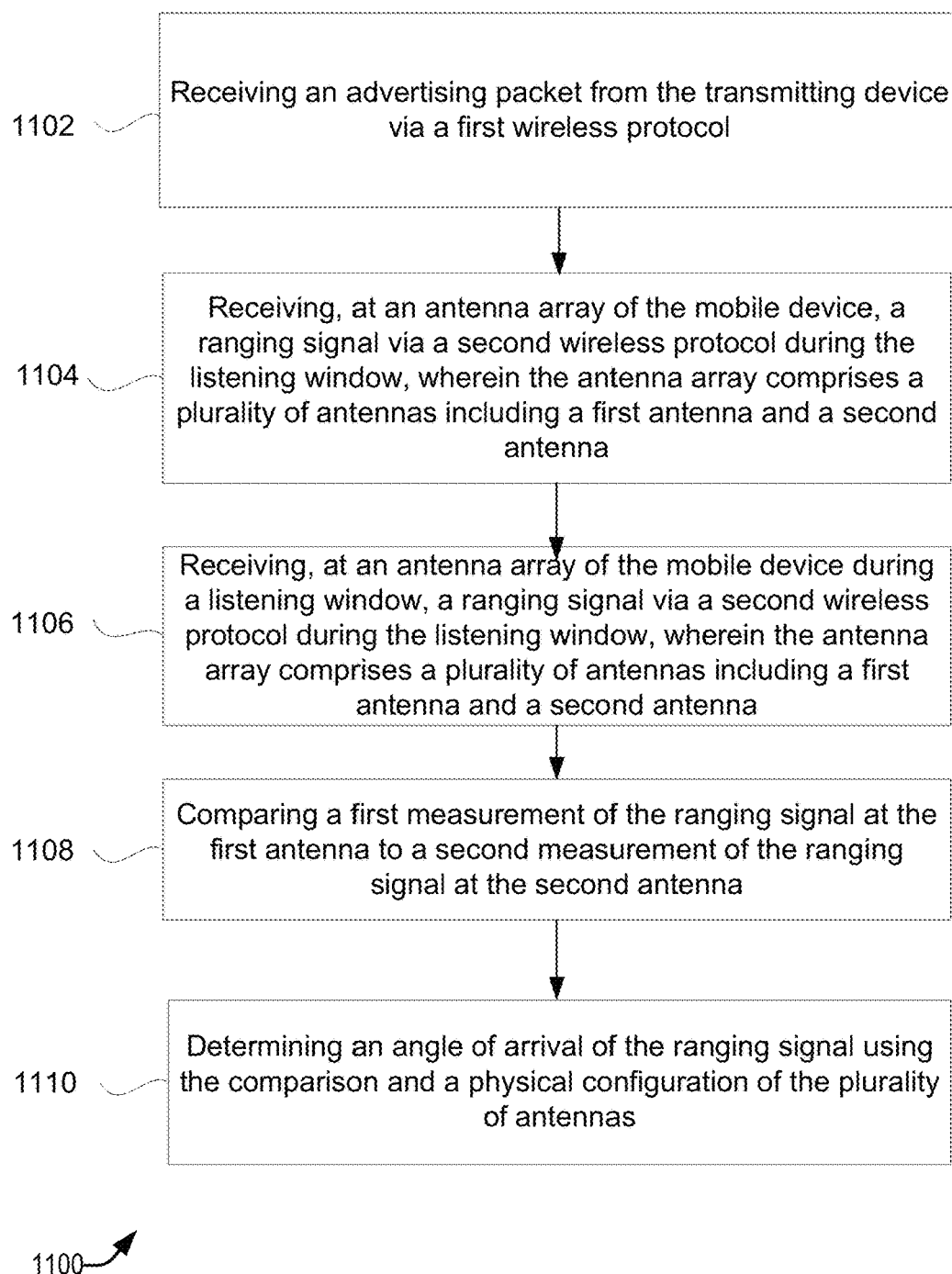
FIG. 11 illustrates an exemplary flowchart for a communication technique performed by one or more receiving devices.

FIG. 11 illustrates an exemplary flowchart for a communication technique performed by one or more receiving device. Method 1100 can be used to determine a spatial relationship of other devices to the transmitting device (e.g., a beacon). Method 1100 can be performed by any device that acts as a receiving device.

At 1102, the technique can include receiving an advertising packet from the transmitting device via a first wireless protocol. The first wireless protocol can be an efficient, low-power protocol (e.g., Bluetooth Low Energy). Bluetooth Low Energy (BLE) is a low power wireless technology used for connecting devices with each other. BLE operates in the 2.4 GHz ISM (Industrial, Scientific, and Medical) band, and is targeted towards applications that need to consume less power and may need to run on batteries for longer periods of time—months, and even years. The information packets can include identification information for the transmitting device. In various embodiments, the advertising packet can specify a schedule for transmitting information packets. In various embodiments, the identification information can include details about an object to which the transmitting device is attached. For example, the transmitting device can be attached to a painting in a museum exhibit. In various embodiments, the identification information can include links to information about the painting. In various embodiments, the transmitter information can include a location of the transmitting device. In various embodiments, the transmitter information can include a link to a floorplan for the transmitter location.

In various embodiments, the receiving device can use the advertising packets as a timing signal for synchronizing timing between the transmitting and receiving devices. The receiving device can use the time of the advertising packets to determine a listening window for receiving one or more ranging signals. The listening window can be a preselected time after reception of the advertising packets. The listening window can be based at least in part on a ranging schedule. In various embodiments, the schedule can be hardcoded in the one or more receiving devices. In various embodiments, the schedule can be hardcoded in the transmitting device.

In various embodiments, the receiving device can determine a signal strength of the advertising signal of the advertising packets. If the signal strength is below a predetermined threshold the receiving device will not be able to engage in various communication techniques.

In various embodiments, the technique can include determining, based on the beacon identification information, the transmitting device has information relevant to an application executing on the mobile device. The application can include functionality that is dependent on a position of mobile device relative to the transmitting device. In various embodiments, the position includes an orientation of the receiving device.

In various embodiments, one or more receiving devices can use the determined listening window to enter a reduced power mode until a time just prior to the listening window. The receiving device can exit the reduced-power mode prior to the listening window.

At 1104, the technique can include receiving during a listening window, at an antenna array of the mobile device, a ranging signal via a second wireless protocol during the listening window. As an example, the second wireless protocol is an ultra-wide band signal. The antenna array comprises a plurality of antennas including a first antenna and a second antenna. The additional antennas can form part of the array. The antenna elements can be at different positions and orientations on the mobile device. Based at least in part on the position and orientation of the receiving device and the positions and orientations of the antenna elements on the receiving device, the ranging signal can be received by the different elements at different times.

In various embodiments, after receiving an advertising packet the technique can include the receiving device entering a reduced power state until the transmission time specified by the schedule. The schedule can provide a time or a listening window for the next ranging transmission. The reduced power mode can include turning off power to the receiving device transceiver. In various embodiments, the reduced power mode can include reducing the gain and/or transmitter power for the transmitter. In various embodiments, dynamic power limiting can be employed to dynamically limit to reduce load and provide margins relative to the power supply's capability.

In various embodiments, the technique can include exiting the reduced power state at the transmission time. In various embodiments, the technique can include exiting the reduced power state at a predetermined time prior to the transmission time or beginning of a listening window. In this way, the receiving device is prepared to receive one or more ranging signal from the transmitting device.

At 1106, the technique can include receiving, at an antenna array of the mobile device during a listening window, a ranging signal via a second wireless protocol during the listening window. The antenna array can include a plurality of antennas including a first antenna and a second antenna. The first reception time can depend on the position and orientation of the receiving device. The first antenna to receive the signal can be considered the first antenna.

At 1108, the technique can include comparing a first measurement of the ranging signal at the first antenna to a second measurement of the ranging signal at the second antenna. The second reception time can depend on the position and orientation of the receiving device. The second antenna to receive the signal can be considered the second antenna.

At 1110, the technique can include determining an angle of arrival of the ranging signal using the comparison and a physical configuration of the plurality of antennas. In various embodiments the determining the angle of arrival can be accomplished by measuring the time difference of arrival (TDOA) between individual elements of the antenna array. TDOA measurement is made by measuring the difference in received phase at each element in the antenna array. TDOA of the ranging signal can be measured using the first reception time, the second reception time, and a known physical configuration of the plurality of antennas. The receiving device can use the known physical configuration of the plurality of antennas and the reception times for various antenna elements to determine an angle of arrival to the transmitting device. The angle of arrival can be expressed with respect to a surface and an orientation of the receiving device. For example, the angle of arrival can be 90 degrees from the top of a receiving device in portrait orientation. The internal phone gyroscopes can inform the receiving device whether it is in a profile or landscape (or some other) orientation.

In various embodiments, a phase difference on arrival may be used to calculate the angle of arrival. Estimating the AOA of an RF signal by an antenna array relies on detecting the signal's phase when it arrives at multiple antenna elements. Due to the difference in propagation distances from the signal source to individual receive antennas, each antenna observes a different phase shift of the signal. For example, if the signal from a transmitter A are assumed to propagate in parallel through space, then the phase observed by the two receive antennas, $\Phi_{A1}$ and $\Phi_{A2}$, can be represented as a function of the angle of incidence $\theta$ and the distance separating the antennas d:

$$\Phi_{A1} - \Phi_{A2} = \frac{2\pi d \sin\theta}{\lambda}$$

where $\lambda$ is the wavelength of the RF signal. Therefore, one only needs to know the phase difference in the antenna array to determine the incidence angle. Therefore, the angle of arrival $\theta$ is a function of the measured phase difference and antenna separation distance d. However, the above equation requires coherent phase detection by the antenna elements in order to compute the difference, meaning that the antenna elements need to be perfectly synchronized in both phase and clock rate. To ensure this, traditional antenna arrays usually are built on a single platform and with multiple antenna elements connecting to the same clock and oscillator.

In various embodiments, the PDoA can work by determining a difference in signal strength at a same reception time for the antennas.

In various embodiments, the technique can include comparing the angle of arrival to a threshold. In some embodiments, the receiving device can know the physical location of one or more transmitting devices at a given location. The calculated angle of arrival and be compared to one of more thresholds. The thresholds can be used to determine if the receiving device is oriented toward a transmitting device or within a predetermined threshold of the transmitting device. For example, if a transmitting device (e.g., a beacon) is attached to a city bus, the receiving device can determine if the receiving device is oriented toward the transmitting device or within a predetermined threshold (e.g., +/−10 degrees).

Based on the comparison of the angle of arrival to the threshold, the technique can include retrieving information specified by the transmitting device. The information can be specified by the advertising packet or the ranging signal. The information can include the identity of the beacon. The information can include a link or deep link to further information concerning the transmitting device. For example, the information can include a link to the bus schedule for the bus on which the transmitting device is attached. The information is specified by the advertising packet or the ranging signal.

In various embodiments, the technique can include determining a second angle of arrival from a second ranging signal from a second transmitting device. The technique can include determining a location of the mobile device by triangulating the ranging signal and the second ranging signal. In various embodiments, more than two transmitting devices can be available in the location.

It should be appreciated that the specific steps illustrated in FIG. 11 provide particular techniques for passive beacon communication techniques according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

VII. Mobile Device for Performing Communications

Figure 12:
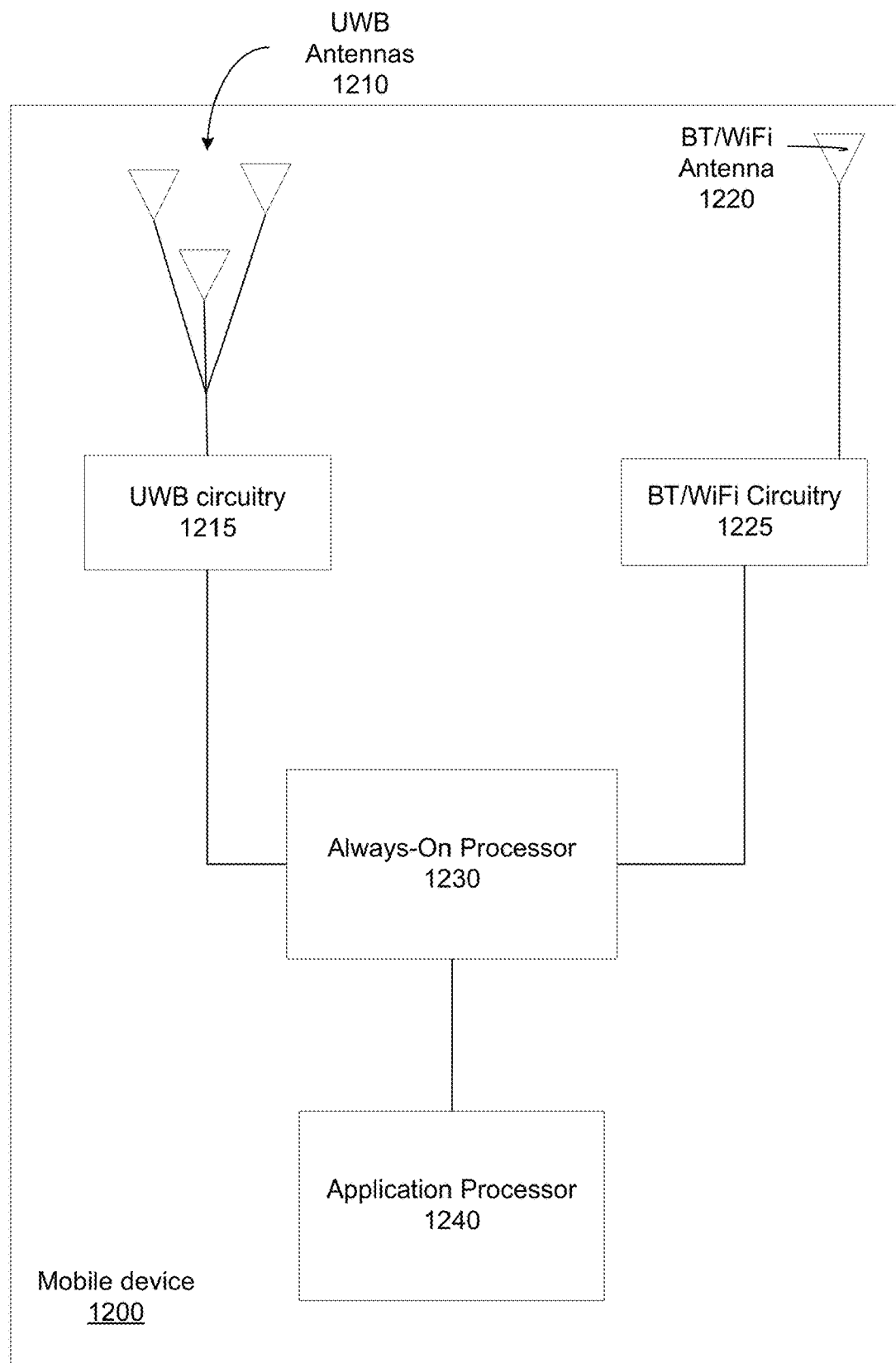
FIG. 12 is a block diagram of components of a mobile device operable to perform ranging according to embodiments of the present disclosure.

FIG. 12 is a block diagram of components of a mobile device 1200 operable to perform passive beacon communication techniques according to embodiments of the present disclosure. Mobile device 1200 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1200 includes UWB antennas 1210 for performing ranging. UWB antennas 1210 are connected to UWB circuitry 1215 for analyzing detected signals from UWB antennas 1210. In some embodiments, mobile device 1200 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1215 can communicate with an always-on processor (AOP) 1230, which can perform further processing using information from UWB messages. For example, AOP 1230 can perform the ranging calculations using timing data provided by UWB circuitry 1215. AOP 1230 and other circuits of the device can include dedicated circuitry and/or configurable circuitry, e.g., via firmware or other software.

As shown, mobile device 1200 also includes Bluetooth (BT)/Wi-Fi antenna 1220 for communicating data with other devices. Bluetooth (BT)/Wi-Fi antenna 1220 is connected to BT/Wi-Fi circuitry 1225 for analyzing detected signals from BT/Wi-Fi antenna 1220. For example, BT/Wi-Fi circuitry 1225 can parse messages to obtain data (e.g., an authentication tag), which can be sent on to AOP 1230. In some embodiments, AOP 1230 can perform authentication using an authentication tag. Thus, AOP 1230 can store or retrieve a list of authentication tags for which to compare a received tag against, as part of an authentication process. In some implementations, such functionality could be achieved by BT/Wi-Fi circuitry 1225.

In other embodiments, UWB circuitry 1215 and BT/Wi-Fi circuitry 1225 can alternatively or in addition be connected to application processor 1240, which can perform similar functionality as AOP 1230. Application processor 1240 typically requires more power than AOP 1230, and thus power can be saved by AOP 1230 handling certain functionality, so that application processor 1240 can remain in a sleep state, e.g., an off state. As an example, application processor 1240 can be used for communicating audio or video using BT/Wi-Fi, while AOP 1230 can coordinate transmission of such content and communication between UWB circuitry 1215 and BT/Wi-Fi circuitry 1225. For instance, AOP 1230 can coordinate timing of UWB messages relative to BT advertisements.

Coordination by AOP 1230 can have various benefits. For example, a first user of a sending device may want share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1230. In addition, it is not desirable to wake up the application processor of every other device in the room, and thus the AOPs of the other devices can perform some processing of the messages and determine that the destination address is for a different device.

To perform ranging, BT/Wi-Fi circuitry 1225 can analyze an advertisement signal from another device to determine that the other device wants to perform ranging, e.g., as part of a process for sharing content. BT/Wi-Fi circuitry 1225 can communicate this notification to AOP 1230, which can schedule UWB circuitry 1215 to be ready to detect UWB messages from the other device.

For the device initiating ranging, its AOP can perform the ranging calculations. Further, the AOP can monitor changes in distance between the other devices. For example, AOP 1230 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VIII. Example Device

Figure 13:
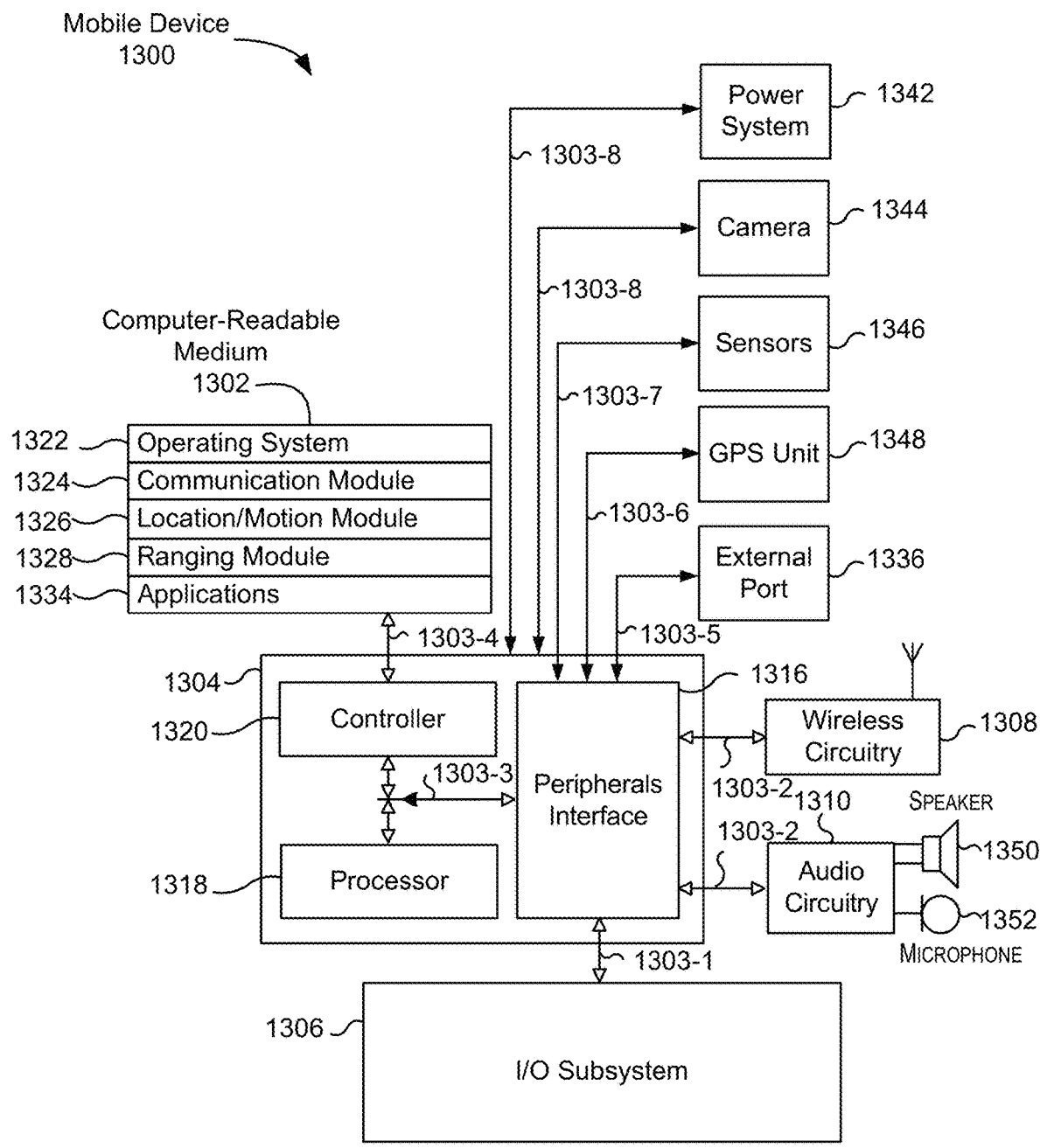
FIG. 13 is block diagram of an example device according to embodiments of the present disclosure.

FIG. 13 is a block diagram of an example electronic device 1300. Device 1300 generally includes computer-readable medium 1302, control circuitry 1304, an Input/Output (I/O) subsystem 1306, wireless circuitry 1308, and audio circuitry 1310 including speaker 1350 and microphone 1352. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application specific integrated circuits.

Wireless circuitry 1308 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1308 can use various protocols, e.g., as described herein. In various embodiments, wireless circuitry 1308 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1308 is coupled to control circuitry 1304 via peripherals interface 1316. Peripherals interface 1316 can include conventional components for establishing and maintaining communication between peripherals and. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of device 1300 to the one or more processors 1318 and computer-readable medium 1302. One or more processors 1318 communicate with computer-readable medium 1302 via a controller 1320. Computer-readable medium 1302 can be any device or medium that can store code and/or data for use by one or more processors 1318. Computer-readable medium 1302 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs). In some embodiments, peripherals interface 1316, one or more processors 1318, and controller 1320 can be implemented on a single chip, such as control circuitry 1304. In some other embodiments, they can be implemented on separate chips.

Processor(s) 1318 can include hardware and/or software elements that perform one or more processing functions, such as mathematical operations, logical operations, data manipulation operations, data transfer operations, controlling the reception of user input, controlling output of information to users, or the like. Processor(s) 1318 can be embodied as one or more hardware processors, microprocessors, microcontrollers; field programmable gate arrays (FPGAs), application-specified integrated circuits (ASICs), or the like.

Device 1300 may include storage and processing circuitry such as control circuitry 1304. Control circuitry 1304 may include storage such as hard disk drive storage, nonvolatile memory (e.g., flash memory or other electrically-programmable-read-only memory configured to form a solid-state drive), volatile memory (e.g., static, or dynamic random-access-memory), etc. Processing circuitry in control circuitry 1304 may be used to control the operation of device 1300. This processing circuitry may be based on one or more microprocessors, microcontrollers, digital signal processors, baseband processor integrated circuits, application specific integrated circuits, etc.

Control circuitry 1304 may be used to run software on device 1300, such as internet browsing applications, voice-over-internet-protocol (VOIP) telephone call applications, email applications, media playback applications, operating system functions, etc. To support interactions with external equipment, control circuitry 1304 may be used in implementing communications protocols. Communications protocols that may be implemented using control circuitry 1304 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1300 may include input-output circuitry 1306. Input-output circuitry 1306 may include input-output devices. Input-output devices may be used to allow data to be supplied to device 1300 and to allow data to be provided from device 1300 to external devices. Input-output devices may include user interface devices, data port devices, and other input-output components. For example, input-output devices may include one or more displays (e.g., touch screens or displays without touch sensor capabilities), one or more image sensors 1344 (e.g., digital image sensors), motion sensors, and speakers 1350. Input-output device may also include buttons, joysticks, scrolling wheels, touch pads, key pads, keyboards, microphones 1352, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)), and any other components typically associated with the generation, management, and distribution of power in mobile devices.

In some embodiments, device 1300 includes an image sensor 1344 (e.g., a camera). In some embodiments, device 1300 includes sensors 1346. Sensors can include accelerometers, compass, gyrometer, pressure sensors, audio sensors, light sensors, barometers, and the like. Sensors 1346 can be used to sense location aspects, such as auditory or light signatures of a location.

In some embodiments, device 1300 can include a GPS receiver, sometimes referred to as a GPS unit 1348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in medium 1302 to perform various functions for device 1300. In some embodiments, the software components include an operating system 1322, a communication module 1324 (or set of instructions), a location module 1326 (or set of instructions), a ranging module 1328 that is used as part of ranging operation described herein, and other application programs 1334 (or set of instructions).

Operating system 1322 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., universal serial bus (USB), FireWire, Lightning connector, 60-pin connector, etc.) is adapted for coupling directly to other devices or indirectly over a network (e.g., the Internet, wireless LAN, etc.).

Location/motion module 1326 can assist in determining the current position (e.g., coordinates or other geographic location identifiers) and motion of device 1300. Modern positioning systems include satellite-based positioning systems, such as Global Positioning System (GPS), cellular network positioning based on "cell IDs," and Wi-Fi positioning technology based on a Wi-Fi network. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data Ranging module 1328 can send/receive ranging messages to/from an antenna, e.g., connected to wireless circuitry 1308. The messages can be used for various purposes, e.g., to identify a sending antenna of a device, determine timestamps of messages to determine a distance of mobile device 1300 from another device. Ranging module 1328 can exist on various processors of the device, e.g., an always-on processor (AOP), a UWB chip, and/or an application processor. For example, parts of ranging module 1328 can determine a distance on an AOP, and another part of the ranging module can interact with a sharing module, e.g., to display a position of the other device on a screen in order for a user to select the other device to share a data item. Ranging module 1328 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1300 (e.g., portions of the display cover layer, portions of a plastic antenna window in a metal housing sidewall portion of housing, etc.). With one illustrative configuration, some or all of rear face of device 1300 may be formed from a dielectric. For example, the rear wall of housing may be formed from glass plastic, ceramic, another dielectric. In this type of arrangement, antennas may be mounted within the interior of device 1300 in a location that allows the antennas to transmit and receive antenna signals through the rear wall of device 1300 (and, if desired, through optional dielectric sidewall portions in housing). Antennas may also be formed from metal sidewall structures in housing and may be located in peripheral portions of device 1300.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 1300 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 1300 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1300. As an example, antennas may be mounted at one or both ends of device 1300 (e.g., along the upper and lower edges of housing, at the corners of housing, etc.).

Antennas in device 1300 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1300 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1344 may include one or more visible digital image sensors (visible-light cameras) and/or one or more infrared digital image sensors (infrared-light cameras). Image sensors 1344 may, if desired, be used to measure distances. For example, an infrared time-of-flight image sensor may be used to measure the time that it takes for an infrared light pulse to reflect back from objects in the vicinity of device 1300, which may in turn be used to determine the distance to those objects. Visible imaging systems such as a front and/or rear-facing camera in device 1300 may also be used to determine the position of objects in the environment. For example, control circuitry 1304 may use image sensors 1344 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1304 may rely entirely upon image sensors 1344 to perform simultaneous localization and mapping, or control circuitry 1304 may synthesize image data with range data from one or more distance sensors (e.g., light-based proximity sensors). If desired, control circuitry 1304 may use display to display a visual representation of the mapped environment.

Input-output devices may include motion sensor circuitry 1346. Motion sensor circuitry 1346 may include one or more accelerometers (e.g., accelerometers that measure acceleration along one, two, or three axes), gyroscopes, barometers, magnetic sensors (e.g., compasses), image sensors (e.g., image sensor 1344) and other sensor structures. Sensors 1346 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1304 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1304. Movement generation circuitry may include electromechanical actuator circuitry that, when driven, moves device 1300 in one or more directions. For example, movement generation circuitry may laterally move device 1300 and/or may rotate device 1300 around one or more axes of rotation. Movement generation circuitry may, for example, include one or more actuators formed at one or more locations of device 1300. When driven by a motion control signal, actuators may move (e.g., vibrate, pulse, tilt, push, pull, rotate, etc.) to cause device 1300 to move or rotate in one or more directions. The movement may be slight (e.g., not noticeable, or barely noticeable to a user of device 1300), or the movement may be substantial. Actuators may be based on one or more vibrators, motors, solenoids, piezoelectric actuators, speaker coils, or any other desired device capable of mechanically (physically) moving device 1300.

Some or all of movement generation circuitry such as actuators may be used to perform operations that are unrelated to rotation of device 1300. For example, actuators may include vibrators that are actuated to issue a haptic alert or notification to a user of device 1300. Such alerts may include, for example, a received text message alert identifying that device 1300 has received a text message, a received telephone call alert, a received email alert, an alarm notification alert, a calendar notification alert, or any other desired notification. By actuating actuator, device 1300 may inform the user of any desired device condition.

Motion sensor circuitry may sense motion of device 1300 that is generated by movement generation circuitry. If desired, motion sensor circuitry may provide feedback signals associated with the sensed motion of device 1300 to movement generation circuitry. Movement generation circuitry may use the feedback signals to control actuation of the movement generation circuitry.

Control circuitry 1304 may use motion sensor circuitry and/or movement generation circuitry to determine the angle of arrival of wireless signals received by device 1300 from another electronic device. For example, control circuitry 1304 may use movement generation circuitry to move device 1300 from one position to another. Motion sensor circuitry may be used to track the movement of device 1300 as it is moved between the different positions. At each position, control circuitry 1304 may receive wireless signals from another electronic device. Control circuitry 1304 may process the received wireless signals together with the motion data from motion sensor circuitry to more accurately determine the position of the other electronic device. The use of motion generation circuitry is merely illustrative, however. If desired, motion sensor circuitry may track movement of device 1300 that is not caused by motion generation circuitry. This may include a user's natural, unprompted movement of device 1300 and/or the user's movement of device 1300 after the user is prompted (by display, audio circuitry 1310, a haptic output device in device 1300, or any other suitable output device) to move device 1300 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 1308 may include radio-frequency transceiver circuitry for handling various radio-frequency communications bands. For example, circuitry 1308 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1300 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1334 on device 1300 can include any applications installed on the device 1300, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1306 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or trackpad. In some embodiments, I/O subsystem 1306 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1306 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device 1300 that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of communicating with a transmitting device by a mobile device, the method comprising:
   receiving, at an antenna array of the mobile device, a ranging signal via a first wireless protocol during a listening window, wherein the antenna array comprises a plurality of antennas including a first antenna and a second antenna;
   comparing a first measurement of the ranging signal at the first antenna to a second measurement of the ranging signal at the second antenna;
   determining an angle of arrival of the ranging signal using the comparison and a physical configuration of the plurality of antennas;
   comparing the angle of arrival to a threshold; and
   based on the comparison, retrieving information specified by a link from the transmitting device.

2. The method of claim 1, further comprising:
   receiving transmitting device identification information in an advertising packet; and based on the transmitting device identification information, determining if the transmitting device has information relevant to an application executing on the mobile device, the application including functionality that is dependent on a position of mobile device relative to the transmitting device.

3. The method of claim 2, wherein the position of the mobile device includes an orientation of the mobile device.

4. The method of claim 2 wherein the information concerns a local environment.

5. The method of claim 2, wherein the transmitting device identification information comprises details about an object to which the transmitting device is attached.

6. The method of claim 1, wherein a schedule for transmitting the one or more ranging signals that comprise transmitting device identification information via an advertising packet using a second wireless protocol is hardcoded in one or more mobile devices.

7. The method of claim 1, wherein one or more ranging packets of the ranging signal comprise a deep link, wherein the deep link is a hyperlink that links to a specific piece of web content on a website.

8. The method of claim 1, wherein an advertising packet comprises one or more deep links.

9. The method of claim 1, wherein an advertising packet comprises a schedule for transmitting information packets, the schedule specifies a time delay following transmission of the advertising packet to listen for the information packets.

10. The method of claim 1, further comprising receiving transmitting device information that comprises a link to a floorplan for a transmitting device location.

11. The method of claim 1, further comprising:
determining a second angle of arrival from a second ranging signal from a second transmitting device, and
determining a location of the mobile device by triangulating the ranging signal and the second ranging signal.

12. A mobile device, comprising:
a processor; and
a memory coupled to the processor, the memory storing instructions, which when executed by the processor, cause the mobile device to perform operations including:
receiving, at an antenna array of the mobile device, a ranging signal via a first wireless protocol during a listening window, wherein the antenna array comprises a plurality of antennas including a first antenna and a second antenna;
comparing a first measurement of the ranging signal at the first antenna to a second measurement of the ranging signal at the second antenna;
determining an angle of arrival of the ranging signal using the comparison and a physical configuration of the plurality of antennas;
comparing the angle of arrival to a threshold; and
based on the comparison, retrieving information specified by a link from a transmitting device.

13. The mobile device of claim 12, wherein the operations further include:
receiving transmitting device identification information in an advertising packet; and
based on the transmitting device identification information, determining if the transmitting device has information relevant to an application executing on the mobile device, the application including functionality that is dependent on a position of mobile device relative to the transmitting device.

14. The mobile device of claim 13, wherein the position of the mobile device includes an orientation of the mobile device.

15. The mobile device of claim 13, wherein the transmitting device identification information comprises details about an object to which the transmitting device is attached.

16. The mobile device of claim 13, wherein a schedule for transmitting the ranging signal that comprise transmitting device identification information via the advertising packet using a second wireless protocol is hardcoded in one or more mobile devices.

17. The method of claim 1, further comprising:
based on the angle of arrival, retrieving information specified by the transmitting device, wherein the information is specified by an advertising packet or the ranging signal.

18. A non-transitory, computer-readable medium storing a plurality of instructions that, when executed by one or more processors of a mobile device, cause the one or more processors to perform operations comprising:
receiving, at an antenna array of a mobile device, a ranging signal via a first wireless protocol during a listening window, wherein the antenna array comprises a plurality of antennas including a first antenna and a second antenna;
comparing a first measurement of the ranging signal at the first antenna to a second measurement of the ranging signal at the second antenna;
determining an angle of arrival of the ranging signal using the comparison and a physical configuration of the plurality of antennas;
comparing the angle of arrival to a threshold; and
based on the comparison, retrieving information specified by a link from a transmitting device.

19. The non-transitory, computer-readable medium of claim 18,
receiving transmitting device identification information in an advertising packet; and
based on the transmitting device identification information, determining if the transmitting device has information relevant to an application executing on the mobile device, the application including functionality that is dependent on a position of mobile device relative to the transmitting device.

20. The non-transitory, computer-readable medium of claim 18, wherein a position of the mobile device includes an orientation of the mobile device.

* * * * *